United States Patent
Kaur et al.

(10) Patent No.: US 10,492,123 B2
(45) Date of Patent: Nov. 26, 2019

(54) OPTIMIZATIONS FOR RELAY COMMUNICATIONS

(71) Applicant: INTERDIGITAL PATENT HOLDINGS, INC., Wilmington, DE (US)

(72) Inventors: Samian Kaur, Plymouth Meeting, PA (US); Amir Helmy, Vancouver (CA); Dimitrios Karampatsis, Ruislip (GB); Guanzhou Wang, Brossard (CA); Saad Ahmad, Montreal (CA); Mahmoud Watfa, Saint Leonard (CA); Loic Canonne-Velasquez, Verdun (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/525,246

(22) PCT Filed: Nov. 9, 2015

(86) PCT No.: PCT/US2015/059743
§ 371 (c)(1),
(2) Date: May 8, 2017

(87) PCT Pub. No.: WO2016/073984
PCT Pub. Date: May 12, 2016

(65) Prior Publication Data
US 2018/0338276 A1    Nov. 22, 2018
US 2019/0098559 A9    Mar. 28, 2019

Related U.S. Application Data

(60) Provisional application No. 62/077,033, filed on Nov. 7, 2014, provisional application No. 62/103,908, filed
(Continued)

(51) Int. Cl.
*H04W 24/04* (2009.01)
*H04W 48/10* (2009.01)
(Continued)

(52) U.S. Cl.
CPC ........... *H04W 48/10* (2013.01); *H04W 24/04* (2013.01); *H04W 76/25* (2018.02);
(Continued)

(58) Field of Classification Search
CPC .................................................... H04W 48/10
See application file for complete search history.

(56) References Cited

U.S. PATENT DOCUMENTS

| 8,781,477 B2 | 7/2014 | Zhang |
| 2007/0002766 A1 | 1/2007 | Park et al. |

(Continued)

FOREIGN PATENT DOCUMENTS

EP    2782293 A1    9/2014

OTHER PUBLICATIONS

Huawei, "Service continuity for Prose," SA WG2 Meeting #108, S2-150822, San Jose Del Cabo, Mexico (Apr. 13-17, 2015).
(Continued)

*Primary Examiner* — Michael T Vu
(74) *Attorney, Agent, or Firm* — Volpe and Koenig, P.C.

(57) ABSTRACT

In one aspect, a method of cell processing is disclosed, which includes disposing a plurality of cells on a substrate across which a plurality of projections are distributed and an electrically conductive layer at least partially coating said projections, exposing the cells to a cargo to be internalized by the cells, irradiating the substrate surface (and in particular the projections) with one or more laser pulses having a pulse width in a range of about 1 ns to about 1000 ns so as to facilitate uptake of the cargo by at least a portion of the cells (e.g., the cells positioned in the vicinity of the projec-
(Continued)

US 10,492,123 B2

Page 2 tions (e.g., within hundreds of nanometer (such as less than 100 nm) of the projections)). In some embodiments, the laser pulses have a pulse width in a range of about 10 ns to about 500 ns, e.g., in a range of about 5 ns to about 50 ns.

12 Claims, 19 Drawing Sheets

Related U.S. Application Data on Jan. 15, 2015, provisional application No. 62/163,123, filed on May 18, 2015.

(51) Int. Cl.
| | |
|---|---|
| *H04W 76/25* | (2018.01) |
| *H04B 7/155* | (2006.01) |
| *H04B 7/26* | (2006.01) |
| *H04W 88/04* | (2009.01) |
| *H04W 4/02* | (2018.01) |
| *H04W 48/00* | (2009.01) |

(52) U.S. Cl.
CPC ........ *H04B 7/15557* (2013.01); *H04B 7/2606* (2013.01); *H04W 4/023* (2013.01); *H04W 48/17* (2013.01); *H04W 88/04* (2013.01)

(56) References Cited

U.S. PATENT DOCUMENTS

| | | | |
|---|---|---|---|
| 2013/0040683 A1* | 2/2013 | Siomina ............ | H04W 28/0236 455/517 |
| 2013/0058272 A1* | 3/2013 | Adjakple ............... | H04B 7/155 370/315 |
| 2014/0016537 A1 | 1/2014 | Khobare et al. | |

OTHER PUBLICATIONS

Interdigital, "Clarification on TMGI Refresh Timer," SA WG2 Meeting #107, S2-150197, Sorrento, Italy (Jan. 26-30, 2015).
Qualcomm (Rapporteur)," Report of email discussion [91#31][LTE/D2D] Relay selection and reselection," 3GPP TSG RAN WG2 Meeting #91bis, R2-15xxxx, Malmo, Sweden (Oct. 5-9, 2015).
Qualcomm Incorporated, "Running stage 2 CR TS 36.300 to capture agreement on eD2D ," 3GPP TSG-RAN WG2 #91Bis, R2-154899, Malmo, Sweden (Oct. 5-9, 2015).
Third Generation Partnership Project, "Technical Specification Group Services and System Aspects; Proximity-based services (ProSe); Stage 2 (Release 12)," 3GPP TS 23.303 V12.6.0 (Sep. 2015).
Third Generation Partnership Project, "Technical Specification Group Services and System Aspects; Proximity-based services (ProSe); Stage 2 (Release 12)," 3GPP TS 23.303 V12.2.0 (Sep. 2014).
Third Generation Partnership Project, "Technical Specification Group Services and System Aspects; Study on extended architecture support for Proximity-based services (Release 13)," 3GPP TR 23.713 V0.1.0 (Jul. 2014).
Third Generation Partnership Project, "Technical Specification Group Services and System Aspects; Study on extended architecture support for proximity-based services (Release 13)," 3GPP TR 23.713 V13.0.0 (Sep. 2015).
Third Generation Partnership Project, "Technical Specification Group Services and System Aspects; Study on extended architecture support for Proximity-based services (Release 13)," 3GPP TR 23.713 V0.3.0 (Nov. 2014).
Third Generation Partnership Project, "Technical Specification Group Services and System Aspects; Study on extended architecture support for Proximity-based services (Release 13)," 3GPP TR 23.713 V0.4.0 (Feb. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.0.0 (Sep. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.4.0 (Sep. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0 (Sep. 2014).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.7.0 (Sep. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.3.0 (Sep. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
ZTE (Rapporteur), "Report of email discussion [90#25][LTE/ProSe] Relay UE initiation, discovery and selection/re-selection," 3GPP TSG RAN WG2 Meeting #91, R2-153764, Beijing, China (Aug. 24-28, 2015).
ZTE et al., "Discussion on relay initiation and discovery," 3GPP TSG RAN WG2 #91, R2-153765, Beijing, China (Aug. 24-28, 2015).
LG Electronics, "Solution on ProSe Relay Selection and Re-selection," SA WG2 Meeting #100, S2-134143, San Francisco, USA (Nov. 11-15, 2013).
Qualcomm Incorporated, "ProSe Direct Discovery for Public Safety use," SA WG2 Meeting #105, S2-143303, Sapporo, Japan (Oct. 13-17, 2014).
Sony, "Considerations on ProSe Relays Selection," SA WG2 Meeting #105, S2-143134, Sapporo, Japan (Oct. 13-17, 2014).
HTC, "Proposals in support of ProSe UE-Network Relay," SA WG2 Meeting #105, S2-143344, Sapporo, Japan (Oct. 13-17, 2014).
Huawei et al., "Discussion on UE-to-network relay," SA WG2 Meeting #101, S2-140177, Taipei, Taiwan (Jan. 20-24, 2014).

\* cited by examiner

US 10,492,123 B2

OPTIMIZATIONS FOR RELAY COMMUNICATIONS

CROSS REFERENCE TO RELATED APPLICATIONS

This application is the U.S. National Stage, under 35 U.S.C. § 371, of International Application No. PCT/US2015/059743 filed Nov. 9, 2015, which claims the benefit of U.S. Provisional Application No. 62/077,033, which was filed Nov. 7, 2014, U.S. Provisional Application No. 62/103,908, which was filed Jan. 15, 2015, and U.S. Provisional Application No. 62/163,123, which was filed May 18, 2015, the contents of which are hereby incorporated by reference herein.

BACKGROUND

Proximity services (ProSe) were introduced in Release 12 (R12) of The 3rd Generation Partnership Project (3GPP). Proximity services provide device to device communications between, for example, two wireless transmit/receive units (WTRUs).

A WTRU may utilize resources for ProSe using the following communication configurations. For example, in a first configuration (e.g., Type 1), an eNode B (eNB) may provide the WTRU with dedicated resources (e.g., via dedicated signaling) that can be used for ProSe. In a second configuration (e.g., Type 2), the eNB may signal, via a broadcast channel, a pool of resources that WTRUs may contend for. Each WTRU may attempt to use the available resources in a contention based approach.

SUMMARY

Embodiments are directed to a method and system of relay node (RN) activation that includes analyzing radio measurements for candidate RNs at an evolved eNB and, in turn, sending a RN activation request if radio measurements are above a particular threshold.

Another embodiment provides a method of selecting a relay node (RN). Such an embodiment receives a broadcast discovery message from one or more RNs. Next, a RN from the one or more RNs is selected based upon the discovery message and a connection to the selected RN is established. According to an embodiment, the discovery message may comprise an indication of respective link quality between the RNs and one or more base station.

Yet another embodiment for RN selection includes receiving, at a wireless transmit/receive unit (WTRU), a service code from one or more RN. A RN from the one or more RNs is then selected based upon the service code and a connection is established to the selected RN.

Further embodiments provide methods and systems for monitoring the connection between a WTRU and a RN. In such an embodiment the RN sends a measurement and/or reporting configuration message and, in response, the WTRU sends one or more keep-alive messages according to the measurement and/or reporting configuration message.

In an embodiment, a wireless transmit receive unit (WTRU) configured to select a relay node (RN) while inside or outside of network coverage is disclosed. The WTRU may include circuitry configured to: receive a broadcast discovery message from one or more RNs, the message comprising an indication of respective link quality between the RNs and one or more base stations; select the RN from the one or more RNs based upon the link quality; and establish a connection to a base station through the selected RN.

In another embodiment, a method for maintaining session continuity during a mobility event is disclosed. The method may include: establishing a first Packet Data Network (PDN) connection between a remote wireless transmit/receive unit (WTRU) and a network through relay node (RN) using an Internet Protocol (IP) address, wherein the remote WTRU is out of network coverage; determining that the remote WTRU has entered coverage of a base station connected to the network; establishing a second PDN connection between the remote WTRU and the base station using the same IP address; sending a message from the RN to notify the network of the establishment of the second PDN connection; and switching traffic flows to the second PDN connection.

BRIEF DESCRIPTION OF THE DRAWINGS

A more detailed understanding may be had from the following description, given by way of example in conjunction with the accompanying drawings wherein.

DETAILED DESCRIPTION

Figure 1A:
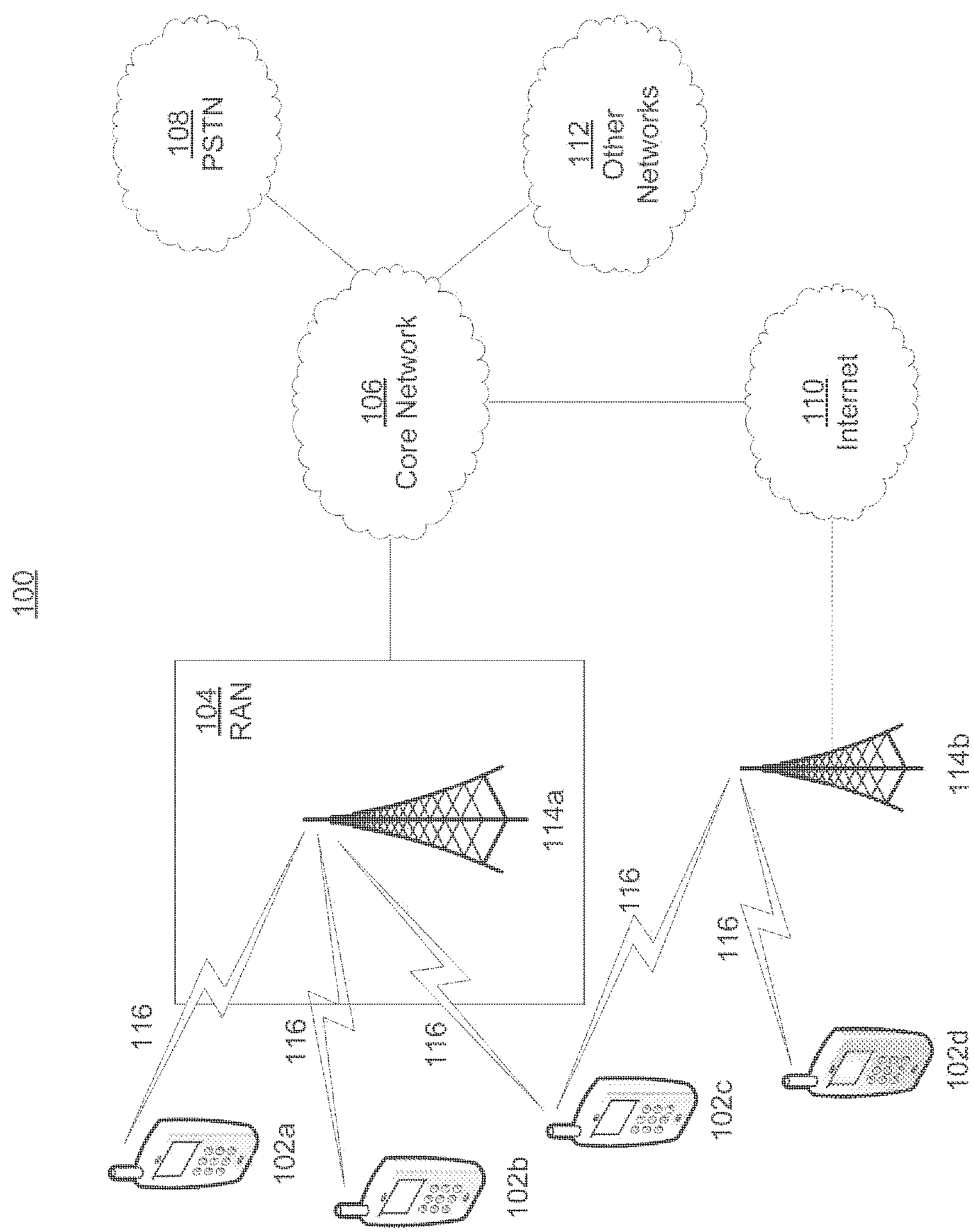
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
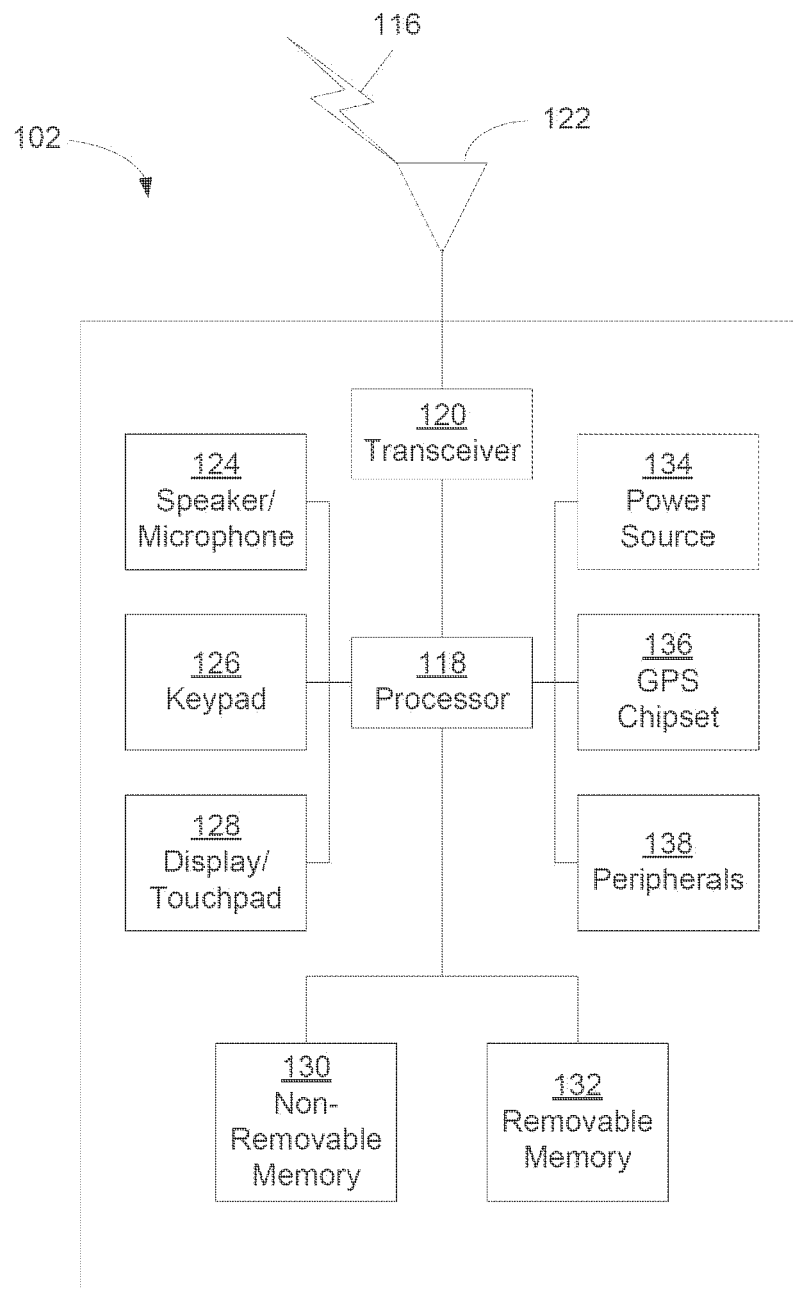
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
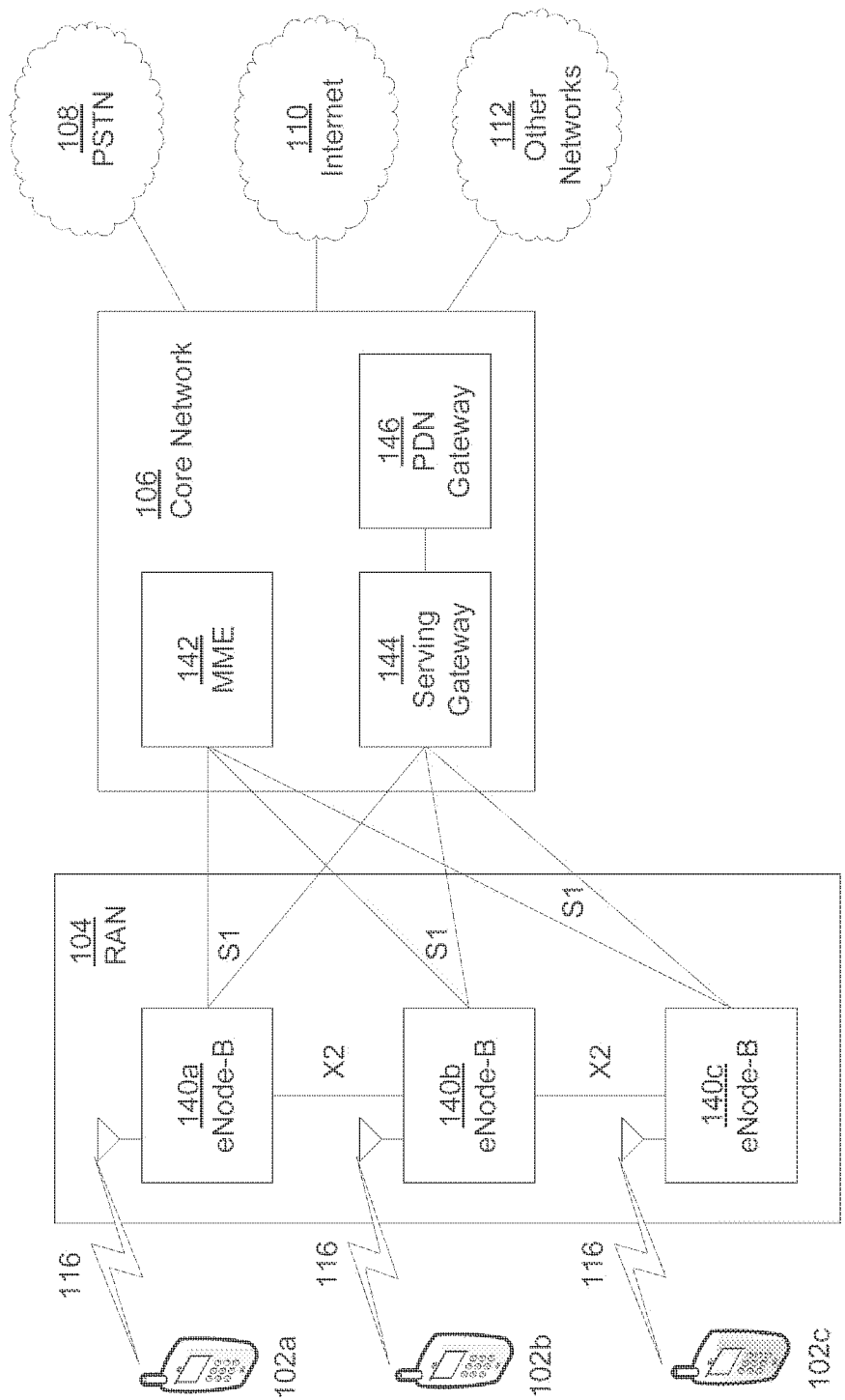
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The configurations for proximity services (ProSe) communications, introduced above, may include the following features. For example, only one-to-many (1-to-many) group communication may be supported in a broadcast manner. Discovery may not be needed for communication. Communication may occur while wireless transmit/receive units (WTRUs) are in or out of coverage. A new layer 2 (L2) media access control (MAC) frame may be defined to carry the ProSe payload. This L2 MAC frame may contain both a source L2 address and a destination L2 address. A WTRU may be configured with its source L2 address and the destination L2 address per group. It should be noted that any of the procedures and methods described herein with respect to WTRUs that are operating in coverage may also be applicable to WTRUs that are operating out of coverage and vice versa.

A ProSe bearer may be defined to contain Packet Data Convergence Protocol (PDCP) Radio Link Control (RLC) and MAC entities. Each ProSe bearer may be specific or associated to a pair of {source L2, destination L2} addresses. This ProSe bearer may be associated with a logical channel ID that may be unique per {source L2, destination L2}. A WTRU may have any number of ProSe bearers for different destination WTRUs. Stated differently, a WTRU may have any number of logical channel IDs. For the same {source L2, destination L2} pair, there may be at most eight (8) ProSe bearers. A ProSe bearer may be established locally in the WTRU without any signaling from the network (e.g., Evolved Node B (eNB) and/or Mobility Management Entity (MME)). Priority of data on ProSe bearers, between ProSe bearers, between data for ProSe versus Evolved Packet System (EPS) (e.g., Internet), and the like, has not yet been defined and may be dependent on WTRU implementation. The MME may provide an indication to the eNB about whether ProSe is authorized for a specific WTRU. This may be done via the context setup procedure over the S1 Application Protocol (S1AP) layer (e.g., between the MME and eNB).

In 3GPP Release 13 (R13), as an extension of ProSe, other aspects for ProSe may be defined. For example, one-to-one (1-to-1) communication, support for quality of service (QoS) for ProSe, enhancements to discovery mechanisms of R12, location and status information of devices, and the like.

Relay architecture aspects of ProSe communications will now be described. When sending data from a ProSe WTRU to an Application, a relay WTRU may act as a Layer3 (L3) router. There may be three architecture options: (1) transparent routing (e.g., without modification of the IP header); (2) performing IP tunneling; and (3) performing IP network address translation (NAT). Other architecture options may also be considered.

Figure 2:
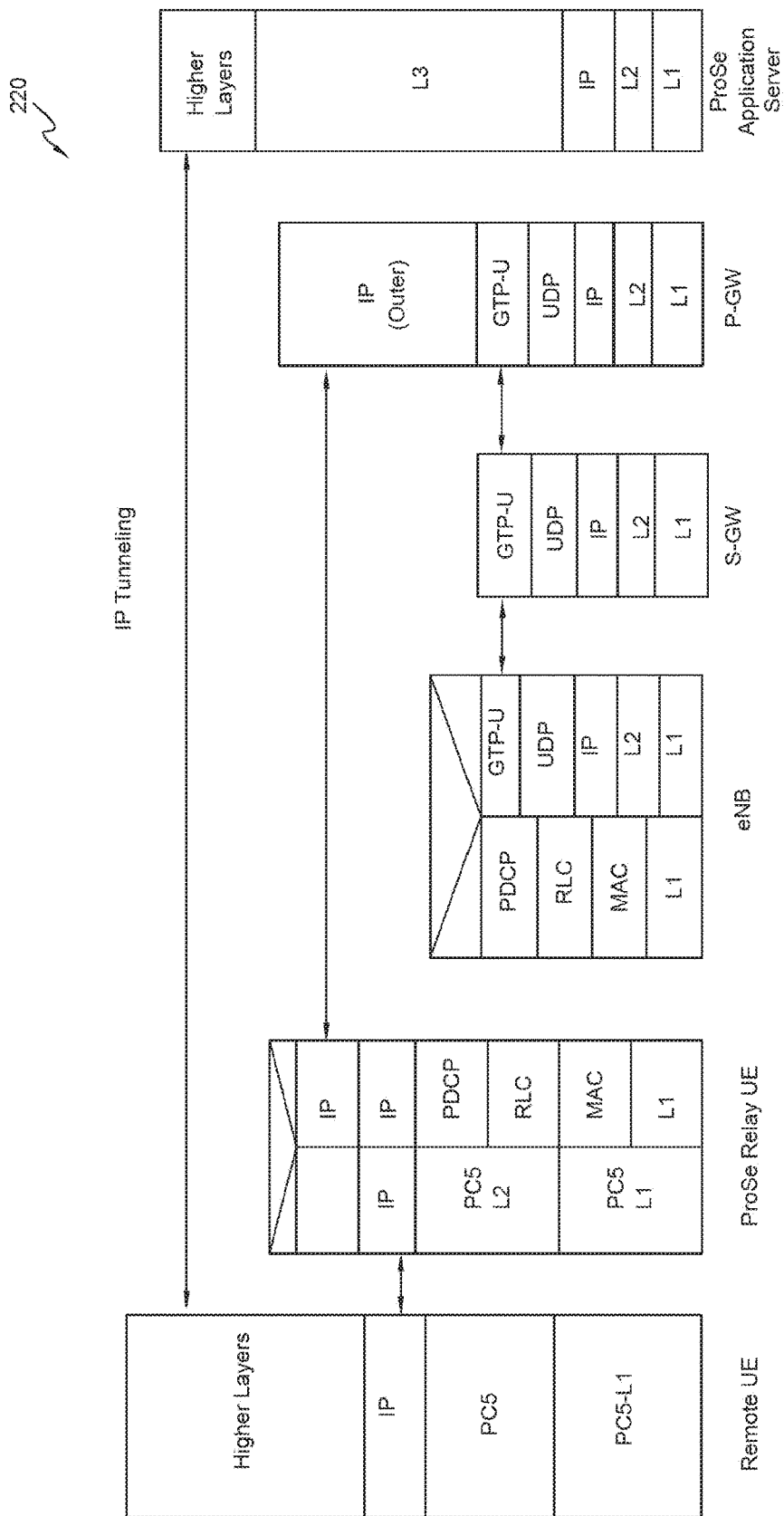
FIG. 2 is a diagram of an example user plane protocol stack using IP tunneling.

Referring now to FIG. 2, a diagram 220 of an example user plane protocol stack for IP tunneling is shown. When performing IP tunneling, the data from the ProSe application may be encapsulated by a relay WTRU with an outer IP frame header. An outer IP address may contain a relay IP address (e.g., ip@ProSe Relay WTRU) as the destination and a ProSe Application Server (e.g., ip@ProSe App Server) as the source. An inner IP address may contain an address of the ProSe WTRU (ip@ProSe WTRU) as the destination and a machine-type communications (MTC) user (e.g., ip@ProSe Appln) as the source.

Figure 3:
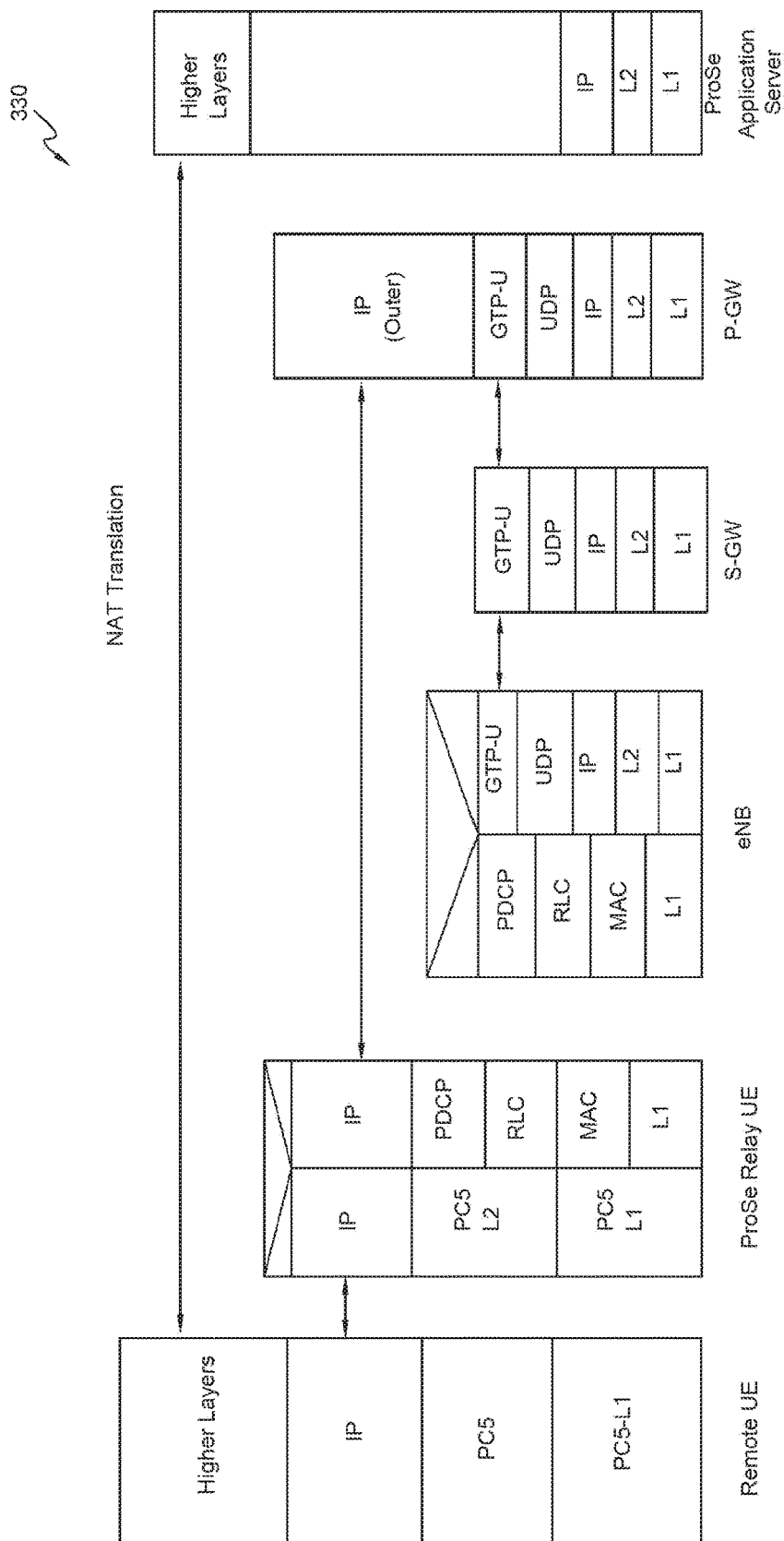
FIG. 3 is a diagram of an example user plane protocol stack using IP network address translation (NAT)

Referring now to FIG. 3, a diagram 330 of an example user plane protocol stack for IP NAT translation is shown. When performing IP NAT translation, the relay WTRU may hide the IP address of a remote WTRU and may replace the IP address of the relay WTRU. It may use port based NAT, or additional code in higher layer packet to mark the remote WTRU in the packet.

Methods and procedures for seamless service continuity from the Evolved Packet Core (EPC) path to the relay path for the remote WTRU are described herein. In one example method, the relay WTRU's MME may be responsible for checking whether the remote WTRU and relay WTRU are connected to the same PGW, or not. If both remote WTRU and relay WTRU are anchored at the same PGW, the PDN connection of Relay WTRU may be reused by remote WTRUs. Otherwise, a new PDN connection may be established to the PGW of remote WTRU.

Figure 4:
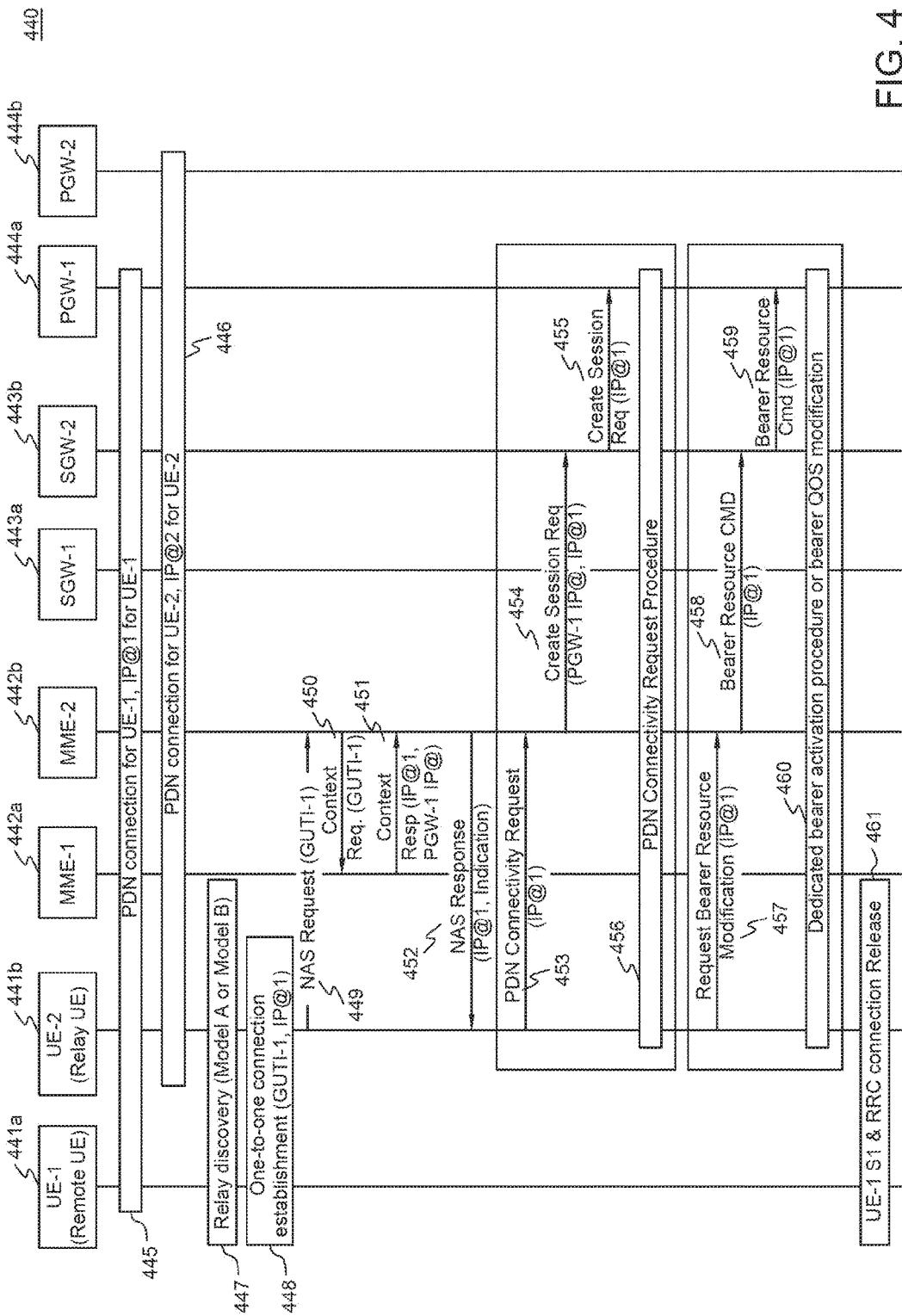
FIG. 4 is a diagram of an example signal flow and the message content to provide relay activation according to an embodiment.

Referring now to FIG. 4, a diagram 440 of a call flow for a service continuity procedure from the EPC path to the relay path is shown. A relay WTRU 441b may obtain a globally unique temporary identity (GUTI) and IP address (i.e. GUTI-1 and IP@1) of a remote WTRU 441a as part of one-to-one connection establishment 448. The remote WTRU GUTI (GUTI-1) may then be passed on to a MME, for example MME-2 442b, to determine if the remote WTRU 441a and relay WTRU 441b belong to the same P-GW. The relay WTRU's 441b MME-2 442b makes this determination and sends a NAS Response 452 with an indication of whether a new PDN connection is required or not. The context request 450 and context response 451 may be performed if the relay WTRU 441b and remote WTRU 441a belong to different MMEs. In this example, the remote WTRU's context is retrieved from its MME, for example MME-1 442a.

Based on the received indication 452, the relay WTRU 441b may either establish a new PDN connection (453-456) or modify the existing PDN connection (457-460).

The relay WTRU 441b may maintain some registration states for remote WTRUs 441a that may be using the relay services. The relay operations may vary depending on whether there are remote WTRUs 441a that need to use a relay service or not. For example, with multimedia broadcast multicast services (MBMS), the presence of remote WTRUs 441a may be a trigger for the relay WTRU 441b to start listening and broadcasting MBMS data that the relay WTRU 441b receives from the network. Additionally, procedures may be provided to authorize a WTRU with the core network and ProSe function. Additionally, to support session continuity, the past association context of the WTRU may need to be provided to the network. Therefore, after detection and discovery of a relay WTRU 441b, the remote WTRU 441a may be required to "register" with the relay WTRU 441b. Currently, there is no mechanism available to enable this registration and the protocol that is used to do so is not yet known.

For the remote WTRU 441a to communicate control messages with the relay WTRU 441b, for example, requesting a specific QoS, specific Temporary Mobile Group Identities (TMGIs), or any other information, a control plane may be required between the remote WTRUs 441a and the relay WTRUs 441b. Moreover, the parameters that may be required to be exchanged via the control plane may be listed depending on the objective. Furthermore, it may be inefficient to broadcast all system information together continually, as some WTRUs may be monitoring the relay, and/or not interested in all the services provided by the relay node.

Relay WTRUs 441b may be configured to operate in relay mode; however, this may not always be desired if relay operation is unnecessary or not required. Hence, it may be efficient to only activate a relay function in the WTRU 441b when a need arises. There is currently no mechanism in 3GPP that allows a dynamic activation or deactivation of relay functions. Moreover, the existing procedures may not support an eNB controlling under which conditions the eNB may operate as a relay.

It is expected that the relay node maintains some state with the remote WTRU 441a, particularly for certain services. The relay may need to keep track of the remote WTRU 441a, so if the relay WTRU 441b is subscribed to certain services for a relay, and if the remote WTRU 441a moves away, the relay WTRU 441b should stop forwarding the MBMS traffic information. Procedures are needed to detect and monitor the link between the relay WTRU 441b and the remote WTRU 441a.

Additionally, there may be a need to provide session continuity when a remote WTRU 441a moves into or out of relay coverage. The policy and charging rules function (PCRF) and the Packet Data Node Gateway (PGW) may need to be updated during mobility, so that the PGW may continue to forward the IP traffic to the remote WTRU 441a without significant interruption. Procedures may be needed to perform mobility from infrastructure to relay and relay to infrastructure mode, and to perform session continuity and IP address preservation when a remote WTRU 441a moves in above mentioned mobility scenarios.

Since ProSe remote WTRUs 441a are not aware of whether MBMS data is being transmitted in the ProSe relay WTRU 441b serving cell, remote WTRUs 441a may keep blindly sending TMGI monitoring requests to the relay WTRU 441b, even though MBMS does not exist in the cell. This not only creates extra PC5 signaling in terms of requests sent from remote WTRUs 441a and corresponding TMGI monitoring reject responses back from relay, but may also result in unnecessary soft state maintenance at the relay.

One possible enhancement is to have the relay WTRU 441b indicate the list of specific TMGIs supported in this area as part of the connection procedure so that the remote WTRUs 441a would have a better idea of the MBMS services that they may request to access via that relay. However, in order to save battery at the relay WTRU 441b, it may be agreed that the relay WTRU 441b shall not advertise all the TMGIs it detects on the service cell but just those specific TMGIs that are of interest to WTRUs it serves and only when requested (i.e., advertisement of a TMGI is on demand). If the relay WTRU 441b is not relaying any MBMS traffic, and thus is not be advertising any TMGIs yet, the remote WTRUs 441a may have no idea if the serving cell of the relay is transmitting any MBMS traffic. Procedures may be needed to assist and efficiently regulate when the remote WTRUs 441a should send TMGI monitoring requests without sacrificing too much battery power at the relay WTRU 441b.

As per the current TMGI advertisement and eMBMS traffic relay approach, a ProSe relay WTRU 441b may individually process each TMGI monitoring request it receives and may respond back to every requesting remote WTRU 441a with a separate TMGI monitoring response to acknowledge the receipt of the request. The soft state at the relay may be maintained on a per-WTRU basis such that a TMGI refresh timer is kept for individual WTRUs. This will result in an increased processing and context load at the relay as the number of responses and contexts would be increasing with the number of remote WTRUs 441a behind the relay. The value of keeping a soft state per WTRU may be analyzed in order to evaluate if it is of any worth to have such a fine degree/resolution at the relay.

For some ProSe groups, more specifically for applications like Mission Critical Push-to-Talk (MCPTT), both static information (e.g., user & group) and dynamic information (e.g., user & group) is required to determine the priority of the ProSE WTRU. Static user information may include a first responder, a second responder, a supervisor, a dispatcher, an administrator, and the like. Dynamic attributes may include a status of the user, a location, a type of incident, a severity, and the like. Static information is most likely stored in a home subscriber server (HSS) and may be available at an MME as part of the WTRU context, whereas dynamic attributes/information may be available at the application level, e.g. MCPTT application server or ProSe Application server. For in-coverage ProSe WTRUs, the priority level at the eNB may be determined by taking into account static and dynamic attributes for the user and a group the user is part of. How the eNB gets this information and processes it to prioritize data from certain ProSe WTRUs and down-prioritize data from other ProSe/non-ProSe WTRUS in terms of resource allocation should be determined.

A ProSe-enabled WTRU may be interested in obtaining location information pertaining to another ProSe-enabled WTRU, either for itself or to forward to another entity (e.g., ProSe Application Server or even another ProSe-enabled WTRU) that might need the knowledge of such location information. Since ProSe WTRUs can often be out of coverage, direct location information transfer between WTRUs over the air via PC5 is desirable.

For a relay WTRU 441b, a remote WTRU 441a, which may be out of coverage, may request the cell ID from the relay WTRU 441b. The cell ID may be the global cell ID that the relay WTRU 441b gets from the cell that it is camped on or being served by. This information, once obtained, may be used by the remote WTRU 441a to send the application server (e.g. a public safety application server) so that the application server "may count" the number of WTRUs that are implicitly transparently served by that cell ID (i.e., via the WTRU-to-network relay). The application server may decide to activate MBMS in that cell, if there is a large number of remote WTRUs 441a being served by a relay WTRU 441b, camping on the reported cell ID. Alternatively, if the number of remote WTRUs 441a is low, the application server may decide to use unicast transmission in that cell. A WTRU may also include location information in discovery messages sent over PC5. Currently, the method used to compute the location information is not specified (e.g. global positioning system (GPS), secure user plane location (SUPL), and the like).

There are issues with the methods described above. For example, including a cell ID may be a very vague estimate for location information. A cell may have a large coverage area and hence the entity that uses the cell ID may not have a precise or accurate estimate of the actual location of the relay WTRU 441b, let alone the remote WTRU 441a that is actually out of coverage of that cell.

Although using cell ID in MBMS (de-)activation may be sufficient, location information provided as a cell ID is not easily extensible to other use cases that require location information. For example, a public safety application server may need to know and track the location of public safety personnel. Therefore, more precise location information may be required. Another use case may simply be for the user of a WTRU to know where he/she is. Therefore, if more precise location information may be displayed, then he/she may use that information in a more useful manner. Simply displaying a cell ID to a user may actually not mean anything if a mapping to an actual geographic location may not be achieved.

Furthermore, when WTRUs include location information in discovery messages, the method used for the computation may not be supported at the receiving WTRU side. For example, if a receiving WTRU expects or requires GPS information and instead gets location information that is computed from SUPL, the received information may be useless for the specific application in the receiving WTRU.

For at least these reasons, it may be desirable to have a flexible and more efficient manner in which location information may be exchanged, such that it meets the requirements or expectation of a receiving node or WTRU. Every WTRU may have different usages for location information. Therefore a method may be desirable to enable WTRUs to request specific location information from other WTRUs that are able to retrieve this information by virtue of their location, specifically being under network coverage, which may ease the retrieval of certain location information. For example, location information from the SUPL framework may only be available when in coverage, whereas GPS location information may be obtained when a WTRU is either in or out of coverage, as long as GPS is supported by the device.

A remote WTRU may connect to the "best relay" (primary relay WTRU) it can discover in its range. This relay may have within its range a set of relay WTRUs (secondary relay WTRUs) it can discover, which may be different from the remote WTRU's list. The remote WTRU may benefit from knowing the locations of the other relay WTRUs that its relay has discovered, however there is currently no way for the remote WTRU to discover these using its relay.

For example, the remote WTRU may be trying to connect or reach other relays, but may not be able to since it did not discover them because they are out of radio range. They may be geographically close, but the remote WTRU may not be able to determine that. The location itself may be sufficient information or it may be used by the user to move closer to another relay node, which may offer it different services or better connectivity. In addition, if the remote WTRU is within range of some of these other relays, the remote WTRU and other relays in the vicinity may save some battery power by having only the remote WTRU's serving relay perform relay discovery and forward this information to the remote WTRU instead of both performing relay discovery.

The method 440 depicted in FIG. 4 may introduce extra signaling to the service continuity procedure from the EPC path to the relay path. In other words, an efficient call flow ID may be desirable so that signaling resources, especially air interface resources, may be used optimally. Extra signaling may pose a larger issue when there are multiple remote WTRUs 441a behind the relay node trying to connect to the network via the relay node in a seamless manner. Moreover, in the method described above, it is the relay WTRU 441b that makes the decision on whether to establish a new PDN connection or modify existing bearers based on the received indication from the MME. It may be possible that this decision may be left to other nodes in the system. Therefore, alternatives are described herein.

In order to establish and configure a communication link between the relay and the remote WTRUs, the relay may need to have a broadcast channel for common system information broadcast and one or more point-to-point signaling channels for control plane protocol messaging between a relay node and remote WTRUs. Thus, methods may be needed to define and provide configurations for separate control channels for separate groups to send broadcast and unicast control signaling over PC5 interface.

To select an appropriate relay and enable communications between a WTRU-to-Network (WTRU-NW) relay and a remote WTRU, some system configuration information may need to be broadcast by the relay node.

Broadcast channel resource configuration may be described herein. The relay WTRU may broadcast information using the one-to-many communication mechanisms defined in R12. One or more fixed subframes (e.g., subframe #0) and fixed resource blocks may be preconfigured for broadcasting the information. Alternatively, the relay WTRU may choose the one or more subframes or resources for broadcasting the information and may include the specific subframe or resource configuration for broadcasting the information in the discovery announcement message (e.g., for model A discovery), or in the discovery response message (e.g., for Model B discovery). The remote WTRU may figure out the one or more subframes or resources where the broadcast information is carried. Either fixed or chosen by the relay WTRU, the resource for broadcast may be a subset of, or the same as, the common resource pool for ProSe which is configured by the eNB that the relay WTRU camps on or is connected to. Alternatively, the relay WTRU may use the PC5 discovery packet to send periodic broadcast information or use a combination of the above methods to send broadcast information to the remote WTRUs.

The relay WTRU may advertise parameters in the initial discovery message to define a control channel for control plane signaling. The Control Channel Configuration parameters may include one or more of the following parameters that may be used to transmit or monitor control channel information: (1) a reserved target logical channel ID for control plane or a separate logical channel ID for each group the relay is providing service for; (2) reserved resources and schedule for transmitting relay system information, for example, certain subframes may be allocated or reserved for transmitting MBMS related system information (e.g., subframe #2, subframe #6); and (3) a schedule for the broadcast messages including separate schedules for short and long broadcast messages (e.g., periodicity and pattern of the system information transmissions, including a separate schedule for short and long broadcast messages).

After discovering and selecting the WTRU-NW relay, a remote WTRU may monitor the configured control channel resources for receiving broadcasted relay info and store the configuration for further communication with the relay.

The WTRUs that neighbor a relay may be connected to the relay node and perform active transactions with the relay, or be idle in relation to the relay node, and monitor all of the neighboring nodes. When the WTRU is operating in IDLE mode in relation to the relay node, or not active in all services offered by the relay, it may be only interested in a portion of the system information being broadcast by the relay.

There may be one or more distinct formats of relay broadcast messages (e.g., relay beacons). In one example, there may be a short relay beacon that is used to carry a minimum set of parameters that may be used to identify a relay, and an extended relay beacon to carry additional information used to determine supported services for the relay node. The parameters included in the short beacon may be one or more of the following: Relay L2 Id, Relay Cell ID, Reserved Logical Channel Id for Signaling Channels, MBMS channels supported.

In one example, the relay may send the short beacon and the extended beacon periodically. The relay may be configured to send the short relay beacon at a different (e.g., shorter) periodicity compared to the extended relay beacon.

In another example, the extended relay beacon may only be sent when requested by a remote WTRU. A receiving WTRU may be configured to listen for short relay beacons. On detecting a short relay beacon that fulfils a preconfigured relay selection criterion, the WTRU may send a request to the relay to request the relay to send an extended relay beacon message.

In one example, the relay short beacon may include the periodicity of the beacon transmissions used by the relay node.

In another embodiment, the short beacon may be sent using a discovery protocol data unit (PDU), and the extended beacon may be sent using a communication PDU over a logical channel defined over PC5.

The relay may use a broadcast message to send a command to the WTRUs to perform a specified action. In some embodiments, the broadcast message may be the beacon message. In other embodiments, the broadcast message payload may be protected and may be decoded only by the WTRUs attached to the relay node. In one embodiment, the relay WTRU may forward commands from the network in the broadcast message. For example, the relay WTRU may forward a paging message from the network in a common broadcast message.

In another embodiment, the relay WTRU may command all attached remote WTRUs to detach from the relay node. For example, a WTRU may choose to, or be configured to, stop acting as a relay node, and may send a message to all WTRUs that are listening or monitoring to terminate their session(s) with the relay node. In addition, this message may trigger a non-access stratum (NAS) signaling release for the remote WTRU.

In another embodiment, the relay WTRU may be configured to announce change in cell ID when it performs handover from one cell to another cell. The short beacon may indicate the schedule of the extended beacon. In some situations, the relay WTRU may indicate in the short beacon the periodicity of the extended beacon and the offset to the subsequent extended beacon. Additionally, the short beacon may indicate if there is new information or a command in the extended beacon. In some situations, receiving WTRUs may determine whether or not to receive the extended beacon based on the indication in the short beacon. A receiving WTRU that is not currently performing active communications using the relay may only listen to extended beacons, if necessary.

To establish communication between a WTRU-NW relay and a remote WTRU, control plane messaging may need to be exchanged between the remote WTRU and the relay node. The control plane signaling over PC5 may use existing or new control plane messages directly over PC5 interface (e.g., the control plane signaling may be transported directly over PC5 interface). In order for the control plane signaling messaging to be distinguished from the data, the control plane messaging may be communicated using one or more logical channels reserved for signaling messages.

A common signaling channel (CSC) may be provisioned in a WTRU communication to transmit and receive control plane signaling with any other WTRU over the PC5 interface, without security activation. In one situation, the CSC may be used to transmit and receive initial connection establishment between WTRUs over PC5 interface (e.g., Radio Resource Control (RRC) messages to be sent over Signaling Radio Bearer 0 (SRB0) may be routed to CSC). A relay node may advertise the resources or parameters (e.g. L2 group ID, logical channel ID) reserved for signaling channels over the Relay Broadcast Channel.

In one embodiment, the parameters to provision the common signaling radio bearer may be preconfigured in the WTRU. In another embodiment, the parameters to provision the common signaling radio bearer may be indicated in the beacon message sent by the relay WTRU. Alternatively, the common signaling radio bearer may use a configuration provided in the Relay Broadcast Channel. In another method, the parameters used for the common signaling radio bearer may be signaled using the Discovery Advertisement Messages.

The CSC may be used to forward paging requests from the network to the remote WTRUs. The relay WTRU may forward paging messages received for any WTRUs that have context in the relay.

In addition, one or more dedicated signaling channels between the remote WTRU and the relay WTRU may be activated when the connection establishment procedure is completed (e.g., Relay Activation during WTRU Attach). The Diameter Signaling Controllers (DSCs) may be used to transmit and receive dedicated control plane access stratum (AS) and NAS messages, for example, RRC and NAS messages to be sent over SRB1, and SRB2 may be routed on dedicated signaling radio bearers.

The CSC may exchange parameters which are used to establish dedicated radio bearers. For example, the security parameters to activate security for dedicated radio bearers may be exchanged over a common radio bearer. Alternatively, the control plane messaging may be distinguished by a control field in the L2/L3 header. In another embodiment, the control plane signaling over PC5 interface may be sent a common channel for ProSe protocol over IP. In another embodiment, the control plane signaling messaging may be carried using PC5 discovery packets, and sent transparently over the AS.

Relay WTRUs may be configured to operate in relay mode; however, this may not always be desired if there is no need for relay operation. Hence, it may be efficient to only activate a relay function in the WTRU (e.g., start relay operations such as broadcasting relay messages) when a need arises. Current mechanisms in 3GPP may not allow a dynamic activation or deactivation of relay functions.

The relay function of a relay capable Public Safety ProSe WTRU may be: (i) activated before discovery either autonomously or as authorized by the network; or (ii) triggered as part of the relay discovery procedure itself (e.g., relay activated only when needed). In the former case (i), the relay functionality may be enabled as per the WTRU's configuration pre-configured at the WTRU or provided by the ProSe Function over IP via the PC3 reference point or possibly provisioned by the core network (e.g., MME). For example, the relay function can be activated whenever a ProSe communication is active regardless of whether there are any Public Safety WTRUs in proximity that need the relay for communication.

When the relay WTRU is configured to act as a relay, it may be configured with the relay discovery mode (e.g., model A or model B relay discovery) that may be adopted by the relay once activated. This may be sent to a WTRU during relay activation by the MME, either directly using a NAS message, or via the eNB instead using a S1-AP message from MME to eNB followed by a RRC message to relay WTRU. The MME may send this relay discovery mode information based on triggers like WTRU context modification in a HSS, WTRU requested relay activation (e.g., based on supported relay discovery mode at WTRU itself), and the like. The relay discovery mode may also be configured by the ProSe Function via PC3 as part of service authorization.

Figure 5:
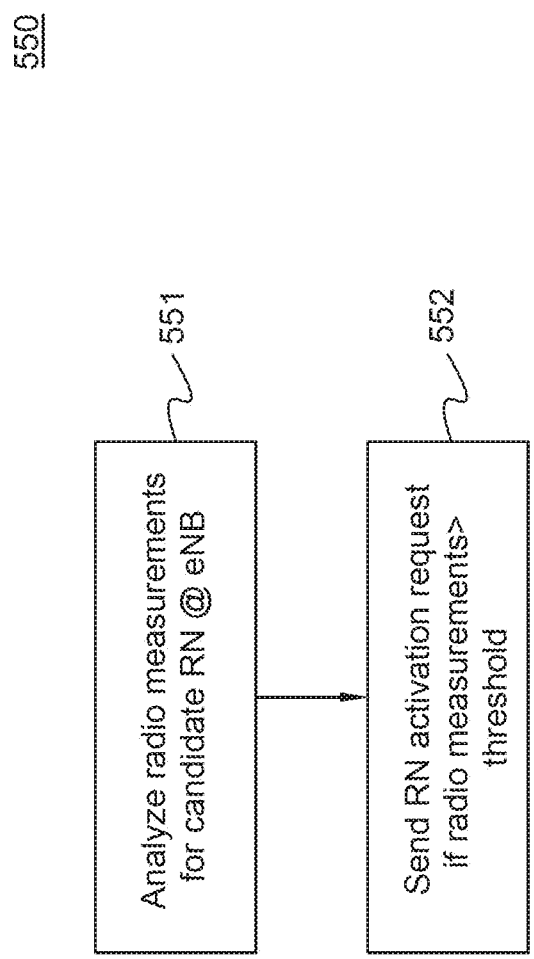
FIG. 5 is a simplified flow diagram of a method of relay node activation according to an embodiment.

FIG. 5 is a simplified flow diagram of a method of relay node activation. The method may be performed at an eNB. The eNB may analyze radio measurements received from a candidate WTRU to determine whether to activate a relay WTRU, at 551. On a condition that the analyzed measurements are above or below a threshold, the eNB may send a relay activation message to the candidate eNB, thereby initiating a relay activation procedure.

Figure 6:
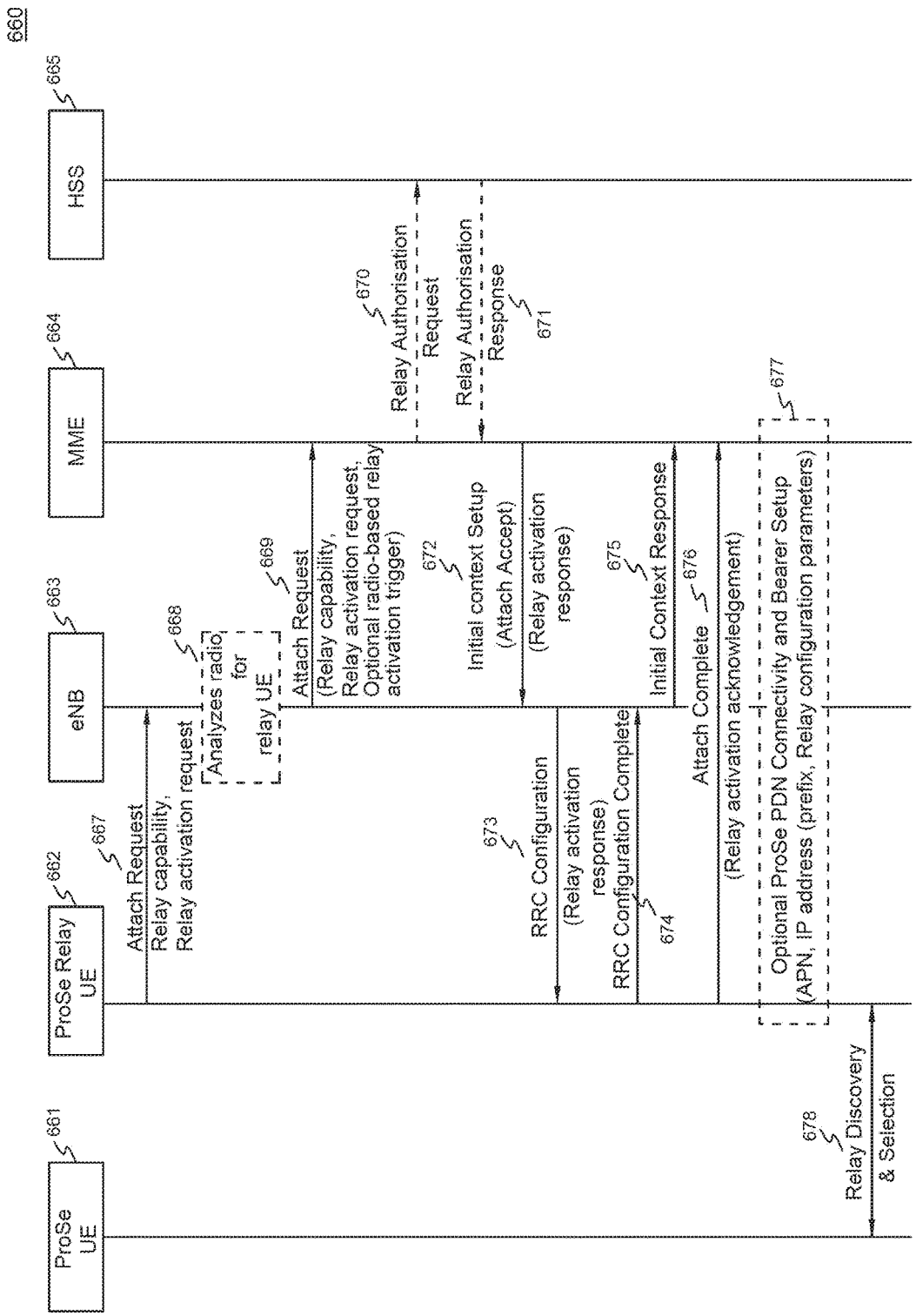
FIG. 6 is a signal flow diagram of an example embodiment of relay activation.

As shown in FIG. 6, the relay activation procedure may be carried out as part of the relay WTRU's network attachment during the initial attach procedure. In FIG. 6, the procedure 660 may be initiated by the relay WTRU 662 sending an Attach Request, including relay capability information, to the eNB 663, at 667. The eNB 663 analyzes radio measurements, at 668. Based on the analyzed radio measurements the eNB 663, may forward the attach request message to the MME 664, at 669. The MME 664 may send a relay authorization request to the HHS 665, at 670. In response, the HHS 665 may send a relay authorization response message to the MME 664, at 671. Based on the relay authorization response message the MME 664 may send an initial context set up, or attach accept, message to the eNB 663, at 672. The eNB 663, may then send an RRC configuration message, including a Relay Activation Response message to the relay WTRU 662, at 673. In response, the relay WTRU 662 may send an RRC configuration complete message back to the eNB 663, at 674. The eNB 663, may then send an Initial Context Response message to the MME 664, at 675. Next, the relay WTRU 662 may send an Attach Complete, including a relay activation acknowledgment, to the MME 664, at 676. Optionally, the relay WTRU 662, eNB 663, and the MME 664, may perform a ProSe PDN connectivity and bearer setup procedure, at 677. The activation procedure concludes with the remote WTRU 661 performing a relay discovery and selection procedure to establish a relay connection with the relay WTRU 662, at 678.

A more detailed discussion of the relay activation procedure may be found herein. The relay WTRU may specify to the MME in an Attach or PDN connectivity request that it is capable of operating as a relay, and make a request to activate relay functionality.

The WTRU may include a Relay Activation Request message in one of the existing NAS messages (e.g., Attach Request) or send a new NAS message, along with its ProSe relay capability incorporated in the WTRU network capability. This may simply indicate that the requesting WTRU is capable of acting as a ProSe relay. Next, the MME may verify the relay authorization with the HSS and/or other network entities before responding back to the ProSe relay WTRU with a Relay Activation Response message to either allow or deny the relay activation function. The Relay Activation Response message may be carried over to the WTRU as part of existing NAS Attach/PDN Connectivity Accept piggybacked on Initial Context Setup and RRC Reconfiguration messages, or as a new message (e.g., over S1-MME control message to eNB followed by RRC message).

The Relay Activation Response message may include the relay discovery mode that may be used by the relay WTRU upon relay activation. The ProSe relay WTRU may enable its relay functionality according to a discovery mode indicated by MME and send a Relay Activation Acknowledgement message to MME in order to confirm that the relay has successfully received the Relay Activation Response message and the relay functionality has been activated or deactivated. This Relay Activation Acknowledgement may be incorporated within the NAS Attach, PDN Connectivity Complete message, or sent as a new message.

For the WTRU-NW relay, when the relay is in-coverage, further information to assist in relay activation may be needed and based on radio measurement reports from the eNB. If the measurements are above or below a specific configured threshold, the relay WTRU at hand may be a potential candidate to act as a relay and the network informs the relay WTRU that it may accordingly activate its relay functionality. For instance, WTRU-NW relays near the cell edge may be more useful to assist in relaying ProSe communication for remote WTRUs that are out-of-coverage, as opposed to relay WTRUs that are near the eNB instead.

This may be realized by having the eNB analyze the WTRU measurements, and in turn, coordinate a trigger with the MME that the radio measurements for the relay WTRU have met or exceeded the minimum threshold to act as a relay. A radio-based Relay Activation Trigger may be included in a S1-MME control message (e.g., Initial WTRU message) together with Attach Request message from eNB to MME. Based on received Relay Activation Request and the additional radio-based Relay Activation Trigger, the MME may further validate the subscription information retrieved from the HSS and may decide on relay activation, including the relay discovery mode, by sending a Relay Activation Response (NAS or S1-MME to eNB followed by RRC) message to relay WTRU 552 in order to trigger the relay activation where the procedure proceeds as described earlier.

If a ProSe relay WTRU attaches as a regular ProSe WTRU (e.g., not as a ProSe relay), or for some reason, the relay activation procedure does not get triggered at attach (e.g., a WTRU has not yet been subscribed for ProSe relay), the WTRU may be configured with relay activation triggers such that the relay may either be autonomously activated or triggered by the network (e.g., MME and/or ProSe Function) after attach.

Once the relay WTRU enables its relay function and notifies the MME with a Relay Activation Acknowledgement, it may need to obtain Relay Configuration parameters from the network (e.g., ProSe Function and/or MME). The Relay Configuration parameters may be provided to the WTRU to use when it needs to operate as a relay, and these parameters may include IP prefix, resource configuration, security configuration, Temporary Mobile Group Identities (TMGIs) that need to be supported, configured ProSe function, and the like.

The Relay WTRU may request for the establishment of additional relay PDN connections along with bearer setup. The Relay WTRU may also acquire the necessary control parameters (e.g., ProSe WTRU ID, radio resources, IP address/prefix, APN information, TMGI, and the like).

Figure 7:
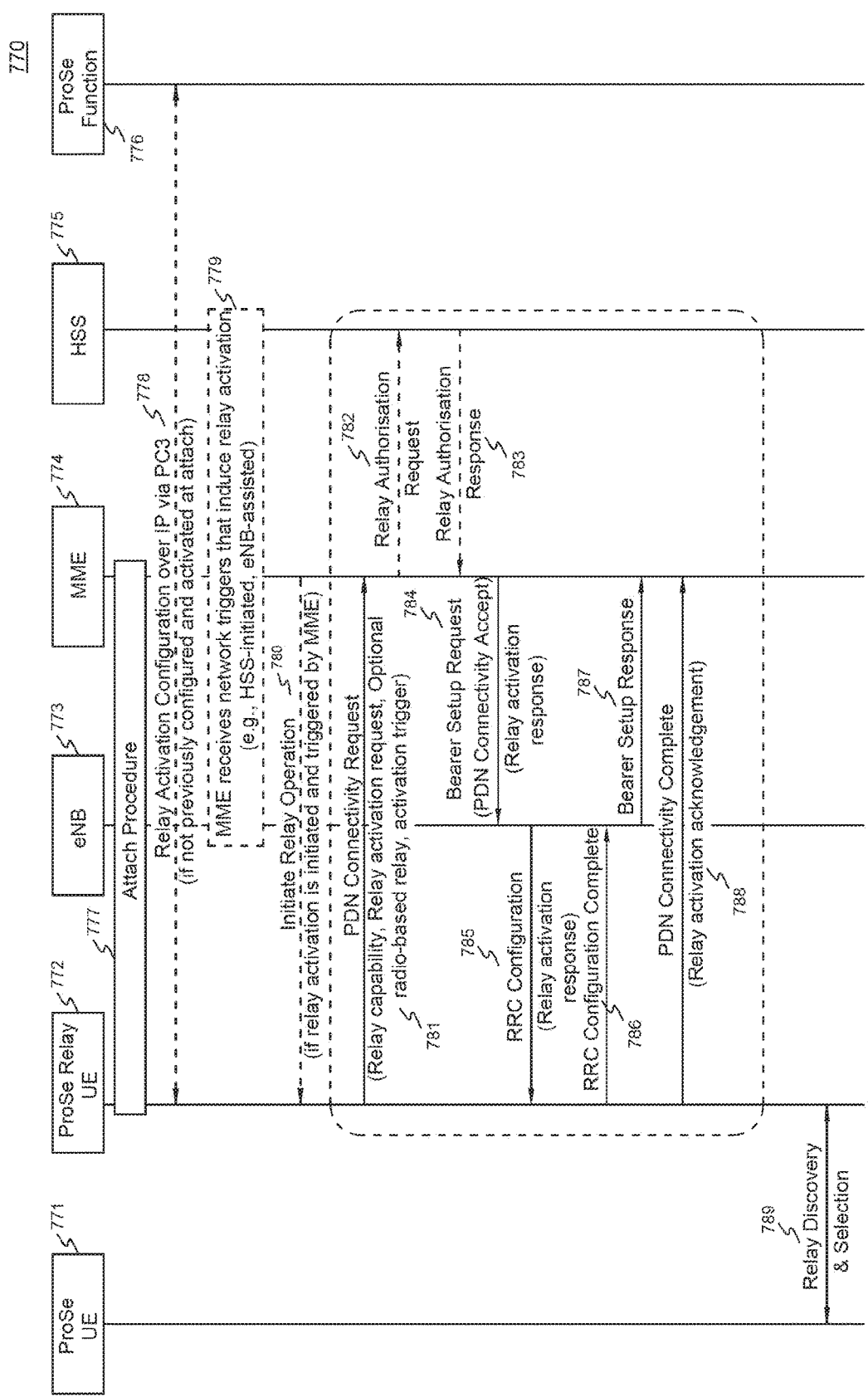
FIG. 7 is a signal flow diagram of a network configure relay operation.

Referring now to FIG. 7, a signal flow diagram 770 of a network configured relay operation is shown. The network entity (e.g., MME 774 or ProSe Function 776) may determine whether to prompt a WTRU 772 to start or stop operating as a relay. As discussed above, the eNB 773 may detect when the reported WTRU measurements reach a specific threshold and may indicate this to the MME 774 so that the MME 774 may decide to enable or disable the relay. A second trigger may come from the HSS 775 due to a change in user's profile defined within subscription information (e.g., a Public Safety ProSe WTRU that was not initially subscribed as a relay becomes subscribed for ProSe relay service, or vice versa, a WTRU that was subscribed for relay is no longer subscribed). In this embodiment, the HSS 775 may need to notify the MME 774 of the subscription update so that the MME 774 may be able to activate or deactivate the relay accordingly. In another embodiment, the activation of the relay WTRU 772 is controlled by the ProSe Function 776 that may be triggered again by the HSS 775 over PC4a or by the ProSe Application Server over PC2 or otherwise.

After the MME 774 determines the need to activate the relay based on one or more of the above triggers, it may send a NAS Initiate Relay Operation message 780 to the relay WTRU 772 to initiate the relay activation. Alternatively, the message to initiate the relay activation may be sent to the relay WTRU 772 via the eNB 773 using a S1-AP message (e.g., WTRU context modification), followed by a RRC message (e.g., RRC reconfiguration). In either situation, a parameter to specify the relay discovery mode to be used upon relay activation may be included by the MME 774 in the message. Once received, the ProSe relay WTRU 772 may either autonomously enable its relay function straight away, or it may further request from the MME 774 specifically to activate its relay by asking for relay PDN connectivity. In the case of activating the relay as part of the PDN connectivity procedure, the Relay Activation Request message may be included in a PDN connectivity request 781. Further, the subsequent messages to follow may be similar to attach-based relay activation discussed earlier, but incorporated into corresponding messages of the PDN connectivity procedure as shown in FIG. 6.

Since the ProSe relay WTRU 772 may stop operating as a relay while being active as a regular ProSe WTRU, the relay function of the ProSe relay WTRU 772 may be deactivated by the network at any time. Again, as soon as the MME 774 determines the need to disable the relay component of the ProSe relay WTRU 772 due to any of the mentioned triggers, the MME 774 may call for PDN disconnection, which may be achieved by modifying the existing MME 774 requested PDN disconnection procedure. A new NAS Terminate Relay Operation may be incorporated within the existing NAS Deactivate EPS Bearer Context Request piggybacked on Deactivate Bearer Request and RRC Connection Reconfiguration, and may be forwarded by MME 774 in order to notify the WTRU 772 that its relay function may need to be deactivated. The WTRU 772 may append a new NAS Relay Deactivation Acknowledgement message to existing Deactivate EPS Bearer Context Accept message to be sent to the MME 774 to confirm the relay deactivation so that the WTRU 772 and the network are on the same page.

In an embodiment, the WTRU 772 may be configured with "Activation Criteria" based on a preset criteria either pre-configured at the relay WTRU 772, or provisioned by the ProSe Function 776 over IP via PC3 778, or provided by the MME 774, or provided by the eNB 773, where the "Activation Criteria" may need to be checked by the WTRU 772 to determine whether it can operate as a relay. Alternatively, the MME 774 may send this information to the eNB 773 in the WTRU context, and the eNB 773 may use this information to send "Activation Criteria" to the WTRU 772. Alternatively, the eNB 773 may send this information over broadcast or dedicate signaling to the WTRU. In one method, the "Activation Criteria" may be sent to the WTRU using System Information Block. In another method, this information may be sent to the WTRU using a RRC Reconfiguration Message. In addition, these criteria may be sent by the ProSe Function 776 to ProSe WTRU 772 during ProSe service authorization before starting the setup of relay discovery or communications.

The Activation Criteria may include one or more of the following criteria: one or more measurement thresholds for transmissions with the eNB 773, when the WTRU 772 moves into or out of predefined areas (e.g., service area, tracking area, public land mobile network (PLMN)), the number of out-of-coverage WTRUs detected by the relay WTRU 772 being above or below a configured threshold, the reception of relay discovery requests/responses at relay WTRU 772, and the like. In one method, the WTRU may be configured to check if the measurement of the eNB 773 is above a configured minimum measurement threshold before initiating relay activation procedures. In another method, the WTRU may be configured to check if the measurement with the eNB 773 is below a configured maximum threshold before initiating relay activation procedures. Along with Activation Criteria, the WTRU 772 may also be able to set up with the relay discovery mode to be utilized when the WTRU 772 is activated to start operating as a relay.

The WTRU 772 may be configured to send a report when the Activation Criteria is met. For example, integrating the report with a relay activation request in PDN connectivity setup 781, or using the trigger to autonomously start a procedure to activate relay operation. Alternatively, the WTRU 772 may be configured to initiate relay operations e.g. initiate transmission of relay discovery messages when the Activation criteria is met. In one method, the report may include a request for resources to perform relay procedures, such as initiating transmission of relay discovery messages.

The relay function of the ProSe relay WTRU 772 may be deactivated by the WTRU 772 upon relay PDN disconnection, which may be achieved by modifying the existing PDN disconnection procedure requested by the WTRU 772. If the particular PDN connection to be released is a relay PDN, the WTRU 772 may request for disabling the relay function altogether by sending the MME 774 a relay Deactivation Request in the PDN Disconnection Request. After ensuring that this relay PDN is not needed and that no other existing relay PDNs are in use, the MME 774 may decide to deactivate the relay function by sending a Relay Deactivation Response to WTRU 772 as part of the NAS Deactivate EPS Bearer Context Request piggybacked on Deactivate Bearer Request and RRC Connection Reconfiguration. The WTRU 772 may confirm the relay deactivation to MME 774 via a NAS Relay Deactivation Acknowledgement message adjoined to existing Deactivate EPS Bearer Context Accept message.

In another embodiment, the relay deactivation may be done within the WTRU or MME initiated Detach procedure instead of being triggered for a specific relay PDN disconnection (e.g., if all the relay PDNs are being released), where new messages to request for and respond to the relay deactivation may be incorporated in existing Detach Request and Detach Accept messages, respectively.

To support session continuity, the past association context of the WTRU may need to be provided to the network. To address these situations, methods to perform the relay WTRU link association and registration may be needed.

Figure 8:
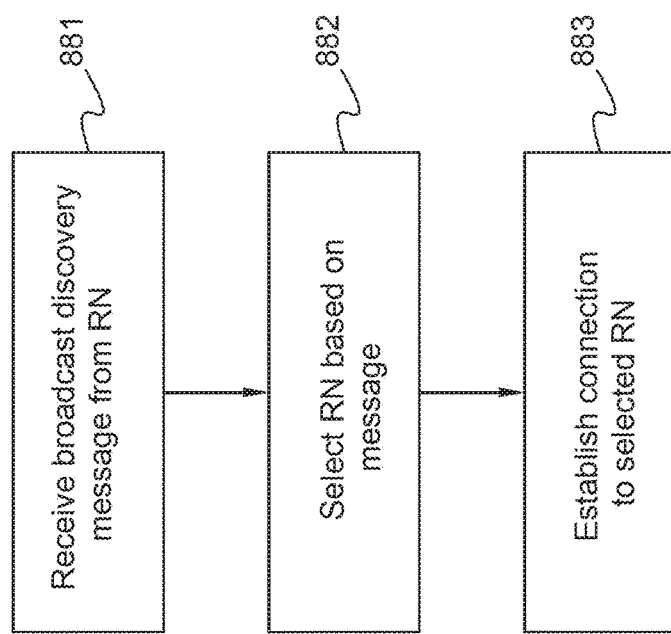
FIG. 8 is a flow diagram of a method of RN selection.
Figure 9:
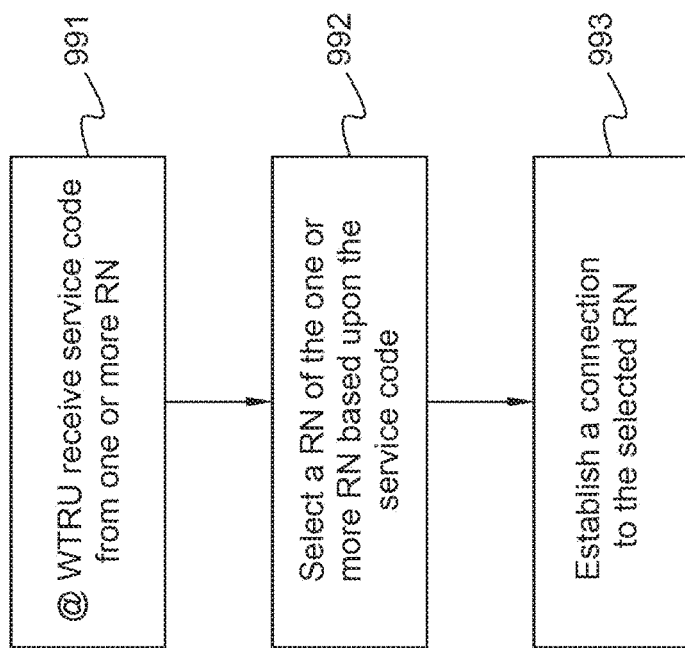
FIG. 9 is a flow diagram of a method of RN selection according to an embodiment.

Referring now to FIGS. 8 and 9, flow diagrams 880 and 990 illustrating RN selection are shown. To enable the communication between a WTRU-NW relay and a remote WTRU, the relay may broadcast configuration parameters necessary to initiate relay operations 881. The configuration parameters may include, for example, the subframes that may be used for uplink (UL) transmission (e.g., in the direction from remote WTRU to relay WTRU) and for downlink (DL) transmission (e.g., in the direction from relay WTRU to remote WTRU) respectively; identification of the groups for which the communication is relayed by this relay WTRU. The configuration parameters may also include the relay WTRU's capability of relaying eMBMS broadcast, and the necessary information for eMBMS receiving if the relay WTRU is capable of eMBMS relaying, including the subframes configured for relayed eMBMS data, Common Subframe Allocation (CSA) period, available TMGIs, Multicast Channel (MCH) scheduling Period (MSP), modulation and coding scheme of each Physical Multicast Channel (PMCH), and the like. In addition, logical channel IDs reserved for sending control plane messaging may also be broadcasted as configuration parameter.

In addition, the relay node may broadcast some additional parameters or IEs in the discovery message (e.g., PC5 discovery message or beacon message described above) to indicate the support for certain services which may be accessed through that relay node 990. One or more of these parameters broadcasted by the relay node may be used to assist in service based relay discovery. These parameters may include: QoS class identifier (QCI) values supported by the relay node; services supported by the relay node, possibly represented by a service code, for example, for voice services, video, short message service (SMS) or messaging service, emergency service, MBMS, PTT service, and the like which may be associated at a WTRU level or access point name (APN) level; Aggregate Maximum Bit Rate (AMBR) which may be at a WTRU level or access point name (APN) level, and both UL and DL AMBR may be broadcasted; downlink and uplink bandwidth that may be available or remaining in the relay node.

The monitoring WTRU or remote WTRU may select the relay WTRU based on the above mentioned broadcasted service parameters (e.g., broadcasted in the PC5 discovery message) by the relay 882, 992. The ProSe protocol in the remote WTRU may receive these service parameters from the higher layers (e.g., Application Layer) in the remote WTRU. The ProSe protocol in the remote WTRU may make a decision to match with broadcasted relay based on the service parameters received from the higher layer and the above described.

The relay node may choose to apply some access control mechanism to alleviate congestion or prevent congestion from one-to-one data communication or traffic connected to the relay node. The access control may be in the form of barring data access, dropping or deactivating the one-to-one communication path or backing off the remote WTRU for sending one-to-one communication data for a certain period of time.

Moreover, the remote WTRU may choose to apply an access control mechanism in one or more scenarios or data congestion situations. For example, a relay WTRU's APN maximum bit rate (MBR) may be close to or may exceed the maximum value. In this case, the relay WTRU may only chose to apply access control to the remote WTRUs connected to that particular congested APN. For guaranteed bit rate (GBR) bearers, this may be when the combined bit rate of the remote WTRUs GBR bearers is close to or exceeds MBR for the corresponding GBR bearer at the relay WTRU. For another example, a WTRU MBR may be close to or may exceed a maximum WTRU AMBR value. In this case, the relay WTRU may choose to apply access control procedure to all the remote WTRUs connected to the relay WTRU. In addition, Access Class Barring (ACB) or other access control mechanisms may be applied by the network for the remote WTRU, and the remote WTRU may receive a backoff indication from the MME for NAS level signaling congestion.

The relay WTRU may indicate the barring or congestion in the PC5 control message. The PC5 message with the access control information may be a dedicated message to a particular remote WTRU or a multicast or broadcast message to group of WTRUs. Moreover, the congestion status (e.g., available bit rate, general load level) may be indicated in the PC5 discovery message. The remote WTRUs may therefore use this load information to make the initial selection of a relay WTRU or switching from a congested relay WTRU to a less congested relay WTRU.

The access control parameter included in the PC5 control message may be in the form of a backoff timer, when the remote WTRU receives the backoff timer, it may not send any one-to-one or one-to-many PC5 communication messages to the relay WTRU for a certain period of time.

Alternatively, the relay WTRU may broadcast a certain QCI or APN in the access control part of the PC5 message. Upon receiving the broadcast, the remote WTRUs, which are connected to the APN via the relay WTRU or have bearers with the broadcasted QCI value, may not send the relay data until the QCI or APN is broadcasted by the relay WTRU in the PC5 control message. Once the APN or QCI is no longer broadcasted, the remote WTRUs may resume the relay communication.

Figure 10:
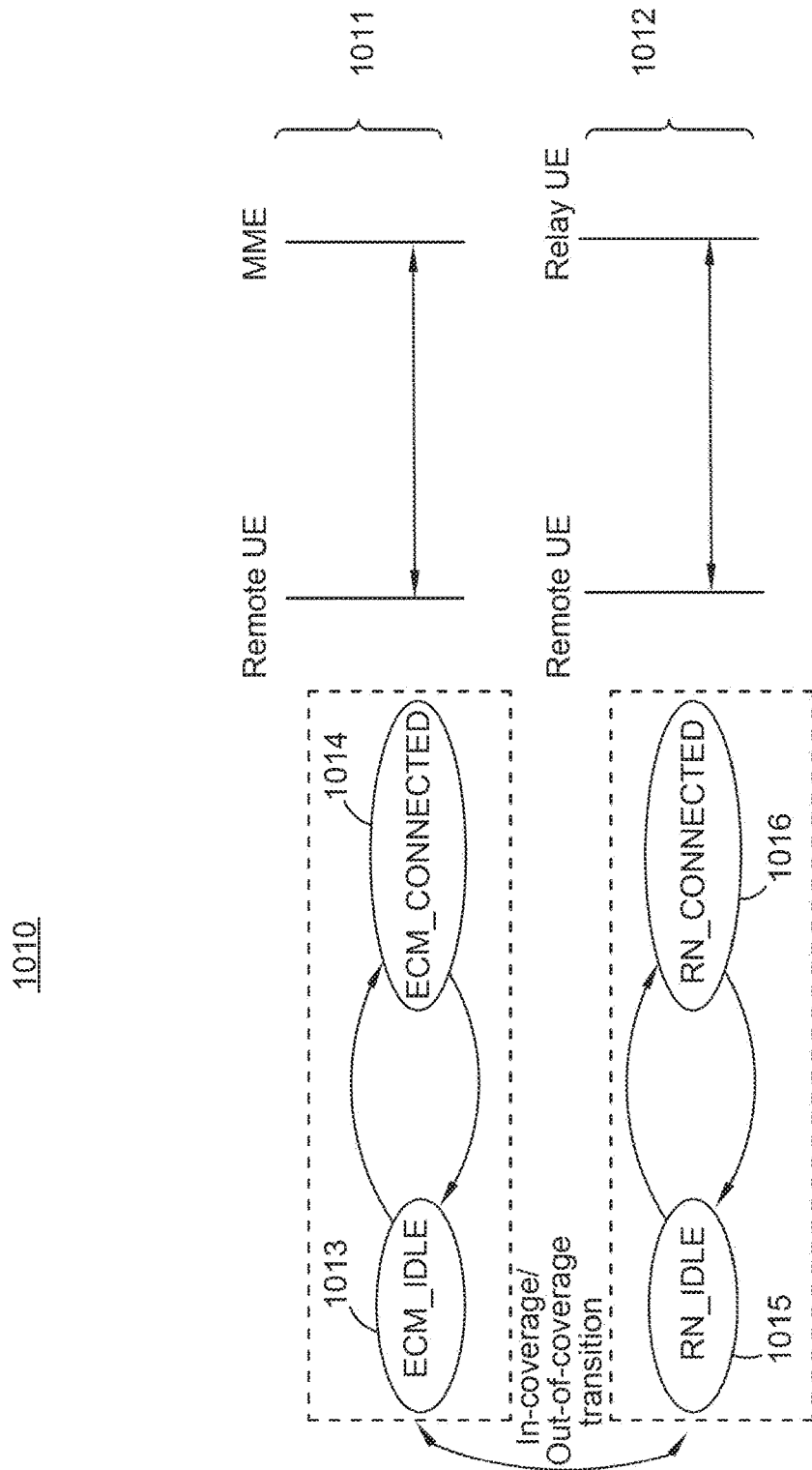
FIG. 10 is a diagram of an in-coverage/out-of-coverage transition of a WTRU.

Referring now to FIG. 10, a diagram 1010 of an in-coverage/out-of-coverage transition of a WTRU is shown. The relay and the WTRU may maintain soft-state information when a link is established. As shown in FIG. 10, a WTRU operating under network coverage may transition out-of-coverage and move in-coverage of a relay WTRU. Once the connection establishment with the relay WTRU is completed, the WTRU may transition to CONNECTED state with the relay node in AS (RRC_CONNECTED) and NAS (RN_CONNECTED) state machine.

The association procedure between the WTRU and the relay node may include the several steps. For example, the relay may send broadcast information for discovering a relay using a Relay Broadcast Channel (e.g., over discovery protocol, broadcast communication channel). A remote WTRU in RN_IDLE 1015/ECM_IDLE 1013 may select the relay and decide to perform an association request. In one embodiment, the association request may use an RRC Connection Request message.

In another embodiment, the association request may be a combined RRC Connection Request and Attach Request, which is received by the relay. In another embodiment, the association request may be a newly defined RRC message. The association request may be protected by the shared key parameters that are known by the relay. The relay may check the security parameters and respond to the message. In the association request, the remote WTRU may send parameters to identify the WTRU including a WTRU identifier, previously used IP address (e.g., if the WTRU was previously attached to the network directly), previously used WTRU L2 identifier, and the like. The relay WTRU may communicate with the MME to authorize the WTRU or obtain the WTRU context before sending an association response to the WTRU. If this requested PDN, by the remote WTRU, is not already used by the relay WTRU, the relay WTRU may need to initiate a new PDN connectivity request to the MME.

The relay may send an association response. In one embodiment the association response may be a RRC Connection Setup message carrying an Attach Complete and/or PDN connectivity accept message. The relay WTRU may create a soft-state for the remote WTRU including the WTRU context received from the MME, and other information including services requested (e.g., groups subscriptions, multicast TMGI participation list, authorized PLMNs, and the like). In the association response, the relay WTRU may provide configuration parameters to the remote WTRU to support monitoring and reporting link conditions between the two WTRUs. The configuration parameters could include the measurement configuration (e.g., schedule, periodicity and threshold) for the Relay-WTRU link and events to report (e.g., threshold met, threshold exceeded, and the like).

Upon receiving the association response, the receiving WTRU may create a soft-state of the relay WTRU, and apply a measurement configuration profile, if configured. In another embodiment, some of the above association procedures may be split into several (e.g., four) messages which may be used for separate messaging of RRC connection establishment and NAS connection establishment.

After a remote WTRU associates with a relay WTRU, the relay WTRU may need to communicate with the MME to send information regarding the remote WTRU.

In an embodiment, the relay WTRU may send a new NAS message to the MME requesting registration of a remote WTRU that may contain a transparent container, including the WTRU identifier, security parameters, relay identifier, relay tracking area, PDN Connectivity Request. The MME may respond with an authentication request for the remote WTRU, also as a transparent container for the relay to forward to the remote WTRU. The MME may also send the remote WTRU context to the relay WTRU, so the relay may perform access control to support bearer establishment requests from the remote WTRU in the future.

In another embodiment, when the relay receives an association request from the remote WTRU, the relay WTRU may separately communicate with the MME to provide information about the remote WTRU or the remote WTRU context before sending an association response to the WTRU. If this requested PDN by the remote WTRU is not already used by the relay WTRU, the relay WTRU may need to initiate a new PDN connectivity request to the MME. In case the remote WTRU is moving from a network, it may also indicate the previous IP address used in the network to the MME in PDN connectivity request.

When an in coverage WTRU moves out of coverage, the MME may start an implicit detach timer, upon expiry of this timer, the MME may remove any context it has for the WTRU and may inform other network nodes (e.g., Serving Gateway (S-GW) and PDN Gateway (P-GW)) that the WTRU is no longer attached to the network. The P-GW may therefore remove the WTRU's IP address from its routing tables and any packets it receives for the WTRU or IP address may therefore be discarded. To avoid such issue in the case of seamless session continuity from infrastructure mode to relay mode, the relay WTRU may send an indication for the remote WTRU (e.g., current IP address of the remote WTRU assigned by the network), and may be in a new defined WTRU registration message.

If the MME receives an indication (e.g., IP address of the remote WTRU) from a relay WTRU that the WTRU is connected to the relay WTRU before the implicit detach timer expires, it may cancel the detach timer and maintain the NAS context of the WTRU. The MME may further inform the S-GW and P-GW about this remote WTRU so that any packets destined for the remote WTRU may be sent on the relay WTRUs bearers. The P-GW may have to update its routing tables and Traffic Flow Templates (TFTs) accordingly. This procedure may only work if the in-coverage remote WTRU was connected to the same MME as the relay WTRU.

When a remote WTRU requests association with a relay WTRU, the relay WTRU may need to communicate with the ProSE function to ensure the WTRU is authorized to use ProSe communication. The relay WTRU may send a remote WTRU ID, and the requested services to the ProSe function.

On completion of the association, the remote WTRU may register with the ProSE function directly over IP. The remote WTRU may also directly communicate with the Application Server, e.g., Group Communication System Enablers (GCSE), to obtain parameters to be used for subscribing to GCSE MBMS sessions.

Upon establishing a connection with the relay node, a remote WTRU may be configured to monitor the broadcast signals and/or beacons from the relay node to ensure the link with the relay WTRU continues to remain suitable.

The remote WTRU may be configured with a measurement configuration to monitor the relay-WTRU link and a reporting configuration to report to the relay WTRU. For example, the WTRU may be configured to determine link failure or degradation if one or more than one beacon from the relay is/are not received within the configured timer window. A remote WTRU may initiate a procedure to select a new relay if the link conditions with the relay node degrade below a configured threshold.

Figure 11:
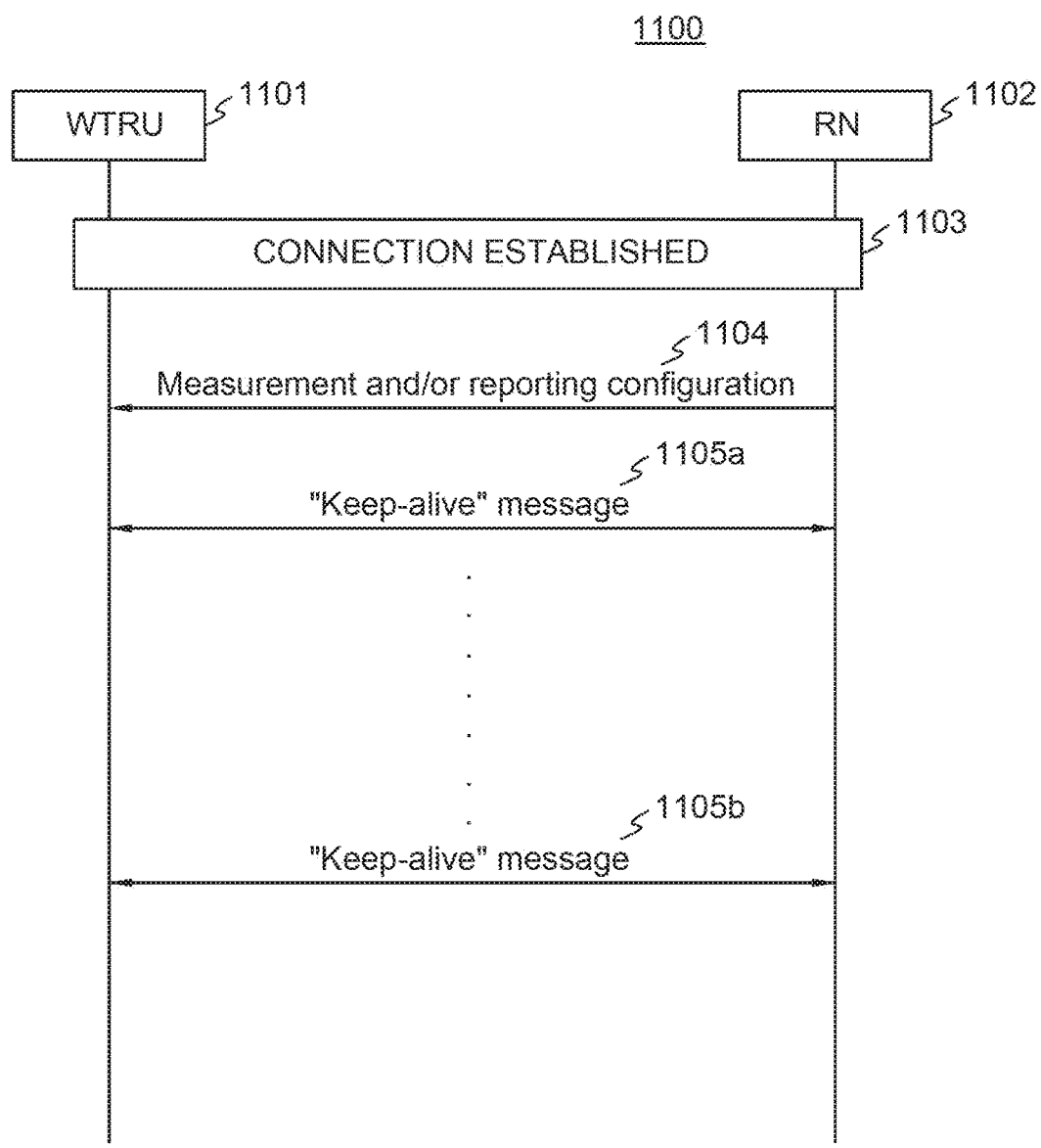
FIG. 11 is a signal flow diagram of a method of monitoring a RN connection according to an embodiment.

Referring now to FIG. 11, a signal flow diagram 1100 for a method of monitoring a RN connection is shown. In an embodiment, a WTRU 1101 may be configured to send periodic keep-alive messages 1105a, 1105b to indicate their presence to a relay node (RN) 1102. The relay node 1102 may provide configuration 1104 of the schedule, periodicity, and content of the messages that need to be transmitted by the WTRU 1101 attached to the relay node 1102. The relay may provide the configuration 1104 of the periodic keep-alive messages 1105a, 1105b using a Relay Broadcast channel or using signaling channels during link establishment. The relay node 1102 may also provide configuration of resources that may be used by the remote WTRU 1101 to transmit the keep-alive messages 1105a, 1105b. In one example, the remote WTRU 1101 may use discovery messages to transmit keep-alive messages 1105a, 1105b. In another example, the relay may configure the remote WTRU 1101 with a schedule on when to transmit the keep-alive messages 1105a, 1105b. The remote WTRU 1101 may be configured to randomize their transmission occasion using their L2 WTRU ID.

On connection establishment 1103, the remote WTRU 1101 may start a timer to transmit the keep-alive messages 1105a, 1105b with the periodicity configured by the relay broadcast message. The relay node 1102 and the WTRU 1101 may monitor the link conditions using the keep-alive messages 1105a, 1105b. In one embodiment, the relay may configure the criteria to measure and report the link conditions. For example, the relay may configure a minimum number of keep-alive messages 1105a, 1105b that the remote WTRU 1101 may be able to detect in a given period. The remote WTRU 1101 may report a link down or link degradation condition if the number of messages detected is below the configured minimum threshold.

Without loss of generality, the measurements and reporting may be performed in AS/L1. Alternatively, the measurements may be performed in the AS, and the AS may send an event to the higher layer when a configured event is detected, for example, relay link down event, relay link degradation event, relay beacon undetected, and the reporting is performed by the higher layer (e.g., a ProSe client).

Similarly, the relay WTRU may determine the presence of the WTRU 1101. In one embodiment, the relay WTRU may command the remote WTRU 1101 to send one or more than one keep-alive message 1105a, 1105b to the relay node 1102. The command may indicate whether the relay requests a single transmission or burst of transmissions, or multiple periodic transmissions. After link establishment, the relay may start performing measurements for the remote WTRU 1101 using the remote WTRU's 1101 transmitted device-to-device (D2D) reference signals. On receiving this command, the remote WTRU 1101 may be configured to send a short preconfigured message or known message sequence to the relay. The remote WTRU 1101 may include one or more parameters in the response message, for example, the remote WTRU L2 ID, the remote WTRU subscription information, the remote WTRU IP address, and the like, in the message.

The remote WTRU may determine the use of the keep-alive message 1105a, 1105b to determine link conditions with the relay. In one embodiment, the WTRU may determine the need to perform mobility when it detects a change in channel conditions with the relay. Additionally, the WTRU may send a trigger to initiate cell selection or relay discovery procedures on detecting change in link conditions with relay WTRU detected based on one or more of the above triggers. In another embodiment, the relay may determine to unsubscribe from subscribed MBMS groups on detecting a loss of link with a remote WTRU based on one or more of the above triggers.

In regard to session continuity, there may be a need to support mobility when a remote WTRU moves into or out of relay coverage. Procedures may be needed to perform mobility from infrastructure to relay and relay to infrastructure mode, and perform session continuity and IP address preservation when a WTRU moves in the above mentioned mobility scenarios. The PCRF and the P-GW may need to be updated during mobility, so that P-GW may continue to forward the IP traffic to the WTRU without significant interruption.

For mobility from a ProSe connection (e.g., PC5) to infrastructure connection (e.g., Uu interface), it may be assumed that a remote WTRU may have selected a WTRU-NW relay and have a direct ProSe connection with the WTRU-NW relay in order to access services (to a particular APN) at the 3GPP access. It may also be assumed that the remote WTRU may have an IP address assigned from the WTRU-NW relay and that the IP address is a public IP address.

One example is the remote WTRU getting in-coverage of an eNB and setting up a PDN connection. The remote WTRU may decide to switch traffic from the WTRU-NW relay to the infrastructure connection. When the remote WTRU gets in-coverage, the remote WTRU may indicate that it supports ProSe session continuity (for example via PCO information). The remote WTRU may send this indication if the PDN connectivity request is at the same APN as with the PDN connection via the WTRU-NW relay.

If the remote WTRU and the PGW support ProSe session continuity (e.g., as part of protocol configuration options (PCO) exchange during the PDN connection establishment to the 3GPP access), the remote WTRU may have a PDN connection via the WTRU-NW relay and a PDN connection via the infrastructure path at the same APN (e.g., same P-GW). The WTRU may initiate a WTRU-triggered switching of all of the connection or some of IP flows from the ProSe direct connection to the infrastructure PDN connection. Similar functionality is supported with Network-based IP flow mobility (NBIFOM) for switching IP flows between the 3GPP access and the wireless local area network (WLAN) access. This may allow NBIFOM to be improved to support switching IP flows between a ProSe connection (e.g., via a WTRU-NW relay) and an infrastructure connection.

In order for ProSe session continuity to work, the remote WTRU may establish a PDN connection over the 3GPP access using the same IP address assigned by the WTRU-NW relay (e.g., in the direct connection). During PDN connection establishment, the WTRU may indicate to re-use the same IP address as the one used in the ProSe direct connection. The WTRU may indicate the willing to preserve the IP address within PCO information indicating also the reason for preserving the IP address (e.g., prose session continuity).

In addition, the remote WTRU may need a NAS-like connection to the WTRU-NW relay so as to provide TFTs. It may be assumed that the remote WTRU may provide a TFT having the remote WTRU public IP address as the source address, and the application server address as the destination address. The WTRU-NW relay uses the TFT in the ProSe connection in order to setup TFTs for WTRU-NW relay PDN connection to the P-GW. When the remote WTRU switches traffic to the infrastructure connection, the remote WTRU provides routing rules with IP traffic information to be moved over the infrastructure path. The routing rules provide information regarding the IP flows to be routed as well as the access leg where these IP flows are moved.

The remote WTRU may include the routing rules within the PDN connectivity request signaling in the infrastructure path. Based on the routing rule information, the P-GW may create a binding table ensuring that downlink traffic information will be provided via the same access leg (e.g., via the infrastructure PDN connection).

In another embodiment, the WTRU may not provide a routing rule but switches sending traffic (e.g., IP flows) from the relay connection to the infrastructure connection. For example, if the remote WTRU has a PDN connection to the same APN (e.g., the same P-GW), the P-GW may detect the switch and ensure that downlink IP flows are sent to the infrastructure PDN connection. The P-GW is aware of the IP address of the remote WTRUs via the TFTs provided by the WTRU-NW relay, for example, the WTRU-NW relay has a source IP address in the TFT information that may be the IP address of the remote WTRU.

When the WTRU has a PDN connection with the 3GPP access and has selected a WTRU-NW relay, the remote WTRU may establish a ProSe connection to the WTRU-NW relay that offers the same APN connectivity as the remote WTRU has with its existing PDN connection. Therefore, the remote WTRU may have PDN connections, via the 3GPP access and via the WTRU-NW relay that connects to the same APN. The remote WTRU may also indicate to the relay WTRU during IP address negotiation to keep the same IP address used on the infrastructure path.

When the remote WTRU switches traffic to the ProSe connection, the remote WTRU may send routing rules via 3GPP access indicating to P-GW and PCRF that specific IP flows may be routed via the WTRU-NW relay. Based on the routing rules, the P-GW may update its binding table to ensure that downlink IP flows are sent via the WTRU-NW relay.

In another embodiment, the WTRU may not provide routing rules, but may switch sending traffic (IP flows) from the infrastructure to the relay connection. For example, if the remote WTRU has PDN connection to the same APN (e.g., same P-GW), the P-GW may detect the switch and ensure that downlink IP flows are sent to the WTRU-NW relay PDN connection. The P-GW may be aware of the IP address of the remote WTRUs via the TFTs provided by the WTRU-NW relay, for example, the WTRU-NW relay has a source IP address in the TFT information that is the IP address of the remote WTRU.

A remote WTRU, while having a connection with a WTRU-NW relay, may keep monitoring for other WTRU-NW relays that provide, for example, better connectivity or closer proximity distance. The remote WTRU, based on its internal selection criteria, may decide to move traffic to the new WTRU-NW relay. For example, the remote WTRU may establish a ProSe connection with the new WTRU-NW relay while keeping the ProSe connection to the old WTRU-NW relay active.

In another example, the remote WTRU may indicate to the new WTRU-NW that it wants to re-use the IP address assigned by the old WTRU-NW relay and access the 3GPP network via the same APN. The remote WTRU may have selected a WTRU-NW relay that provides connectivity to the same APN and thus to the same P-GW. Therefore, the remote WTRU may re-use the IPv6 prefix obtained from the old WTRU-NW relay. The remote WTRU may send this indication via NAS protocol on the prose connection in order to avoid starting Dynamic Host Configuration Protocol version 6 (DHCPv6) auto-configuration. Alternatively, the remote WTRU may also indicate to the relay WTRU during DHCP negotiation to keep the same IP address used on the infrastructure path.

When both connections are active, the remote WTRU may switch traffic to the new WTRU-NW relay. The NBIFOM procedure may be re-used, for example, and the remote WTRU may send the routing rules to the WTRU-NW relay that the remote WTRU wants to switch traffic to. The WTRU-NW relay may forward the information to the P-GW using a separate PDN connectivity procedure. When the PGW receives the routing rules it may be aware that the remote WTRU wants to switch traffic to this PDN connection and may ensure that downlink IP flows are sent via the same PDN connection.

In another embodiment, the WTRU may not provide routing rules but may switch sending traffic (e.g., IP flows) from one relay to the other relay connection. For example, if the remote WTRU has a PDN connection to the same APN (e.g., same P-GW), the PGW may detect the switch and ensure that downlink IP flows are sent to the WTRU-NW relay PDN connection. The PGW may be aware of the IP address of the remote WTRUs via the TFTs provided by the WTRU/NW relay, for example, the WTRU-NW relay has a source IP address in the TFT information that is the IP address of the remote WTRU.

A WTRU may receive threshold conditions from the RAN (e.g., signal strength, signal quality) via RAN assistance information. These may allow the WTRU to determine when the WTRU should switch traffic from an infrastructure connection to a direct connection over a WTRU to network relay. If the WTRU detects that a handover is required, based on the conditions specified in the RAN assistance information, the WTRU may start a ProSe Discovery procedure in order to identify a WTRU operating as a WTRU-NW relay. In addition the RAN (i.e., eNB) may trigger a WTRU to initiate a handover to a WTRU-NW relay.

The following embodiments may be considered for an eNB driven handover. The ProSe enabled WTRU may report measurements to the eNB. The eNB may be aware that a WTRU is ProSe enabled via the information received via the MME based on subscription information. The eNB may also be aware that the WTRU is configured as a WTRU-NW relay. The eNB may also be aware that a WTRU is configured as a WTRU-NW relay based on the following: (1) information provided by the MME via S1-MME reference points based on subscription information (HSS driven) or ProSe Function Information via a new MME-ProSe Function interface; or (2) information provided by a WTRU-NW relay via RRC signaling toward the eNB.

Based on the measurements reported by the ProSe enabled WTRU, the eNB may decide to trigger handover to the WTRU-NW relay. The eNB may provide a handover trigger to the ProSe enabled WTRU in order to handover to a WTRU-NW relay. When the ProSe enabled WTRU detects the handover command, the WTRU may initiate its ProSe discovery procedures in order to identify the WTRU-NW relay. Once the WTRU detects the WTRU-NW relay, the WTRU may initiate a 1:1 ProSe communication in order to access the Evolved Packet Core (EPC) service via the UE-NW relay.

In another example, the ProSe enabled WTRU may detect a relay WTRU, using synchronization reference signal measurements or based on ProSe discovery procedures. The ProSe enabled WTRU may send measurements (e.g., signal strength measurements) from the relay WTRU as well as measurements from eNB to the eNB. The eNB may be aware that WTRUs are ProSe enabled and ProSe authorized based on the methods discussed above. Based on the reported measurements, the eNB sends a handover (HO) command, and releases the WTRU from the infrastructure connection.

In another example, the ProSe enabled WTRU may detect a weak signal strength and send a measurement to the eNB. Based on the reported measurement, the eNB may trigger another ProSe enabled WTRU to start operating as a relay node. The eNB may send a HO command (without a target) to indicate that the WTRU should perform relay discovery, and provide resources to perform relay discovery. When the ProSe enabled WTRU detects the handover command, the WTRU may initiate its ProSe discovery procedures in order to identify the WTRU-NW relay. Once the WTRU detects the WTRU-NW relay the WTRU initiates a 1:1 ProSe communication in order to access the EPC service via the WTRU-NW relay. The eNB may be aware that WTRUs are ProSe enabled and ProSe authorized based on the alternatives discussed above.

In another example, when the eNB detects that a WTRU is to be handed over to a relay WTRU, or when the eNB sends a HO command to the remote WTRU, the eNB may send a S1-AP message to the eNB indicating the remote WTRU is being handed over. The message may include, for example, the ID of the remote WTRU and the ID of the relay WTRU that the remote WTRU is being handed off to. The MME may use this information to suspend the context of the remote WTRU, or apply a longer expiry timer to remove the context of the remote WTRU.

In another example, when a relay WTRU obtains a registration request from a new WTRU, it may send an indication to the MME, so that the MME knows that the WTRU has moved from the network and is now registered with the relay WTRU. The MME may use this information to suspend the context of the remote WTRU, or apply a longer expiry timer to remove the context of the remote WTRU. Alternatively, the remote WTRU may send an indication to the MME before it performs handover from infrastructure to a relay node. The MME may use this information to suspend the context of the remote WTRU, or apply a longer expiry timer to remove the context of the remote WTRU.

In support of public safety ProSe communication, a WTRU-NW relay may need to support a ProSe broadcast and ProSe Group communication, and may be configured with multiple authorized broadcast or multicast group identifiers.

The ProSe WTRU-NW Relay may be attached to EPS following normal WTRU procedures. As a part of the connection establishment procedure, the ProSe WTRU-NW relay may indicate to the WTRU whether it supports MBMS and the services indicated by TMGIs that are supported in the area.

One problem with supporting multicast operation through a WTRU-NW relay is how the public-safety WTRUs may obtain the TMGI information associated with the services that the WTRU is interested in. Methods may be required for the out-of-coverage WTRU to determine the TMGIs that it is interested in the service area of the relay WTRU. In one embodiment, an out-of-coverage WTRU may be preconfigured with TMGIs applicable for all service areas in the PLMN. However, if the WTRU is roaming in another PLMN, it may still need to determine the TMGI that is being used in the service area of the relay it is attached to.

In another embodiment, the relay WTRU may advertise its service area and PLMN in the broadcast channel, and a remote WTRU seeking to subscribe to a particular service may register with the GCSE application server (AS) and report the relay's PLMN and service area. The GCSE AS may verify the WTRU's subscription profile and provide the TMGIs of interest to the WTRU. To perform this procedure the remote WTRU may use the ProSe WTRU-NW Relay as an IP router. Once the WTRU obtains the TMGIs of interest, it may need to reselect to another relay in case there is another relay in the vicinity that is already broadcasting those MBMS groups.

Another problem in WTRU-NW-relay networks may be the need for a mapping of the MCH channel to carry the MTCH and MCCH information. In existing networks, the MCH may be mapped to Multimedia Broadcast multicast service Single Frequency Network (MBSFN) resources in the subframe. In WTRU-NW-relay networks, the relay may reserve certain resources for MBMS transmissions. The relay may advertise the schedule of the reserved resources to the remote WTRUs on the Broadcast channel or during bearer establishment on the Signaling Channel. In one example, the relay may broadcast a schedule separately for each TMGI supported by the relay node. For instance, a schedule from the relay may be defined in the following manner [{TMGI1, Subframes #}, {TMGI2, Subframes #}, . . . {TMGIn, Subframes #}]. WTRUs may use this information to determine when they need to receive multicast information, and may perform power saving.

To make sure that the TMGI monitoring requests are sent only when there is an MBMS transmission occurring on a relay's serving cell, the relay WTRU may indicate to the remote WTRUs, via broadcast either before or during relay discovery, if MBMS data actually exists in the cell. This indication may serve as a prerequisite for remote WTRUs to be able to send TMGI monitoring requests to a relay such that if the MBMS is not present within the cell, the remote WTRUs will not request the relay to monitor a specific TMGI.

Since the relay advertises the availability of the TMGIs that are currently being relayed, which may directly imply that MBMS is present and being actively relayed, the MBMS absence/presence indication may be periodically broadcasted by the relay when the relay fails to detect any TMGIs or when no TMGIs are being advertised/announced. Thus, remote WTRUs in the relay's vicinity may be aware if MBMS is available through that particular relay or not, which is useful in assisting remote WTRUs in selecting the desired relay based on the services the remote WTRU is interested in. For instance, the MBMS absence/presence indication may be incorporated in WTRU-to-Network relay discovery messages, such as in an announcement message in Model A WTRU-NW relay discovery and/or in discovery response messages in Model B WTRU-NW relay discovery if solicited before by a discoverer (e.g., as part of connectivity information attribute of relay discovery messages).

The TMGI refresh timer may be provided by a relay to the remote WTRU when the MBMS data is actually detected, as opposed to including it in the acknowledgement response from the relay that confirms the receipt of the WTRU request. This may guarantee that the TMGI refresh timer is indeed applicable to MBMS data that was successfully captured by the relay and will be forwarded over to the remote WTRU for as long as the duration of the TMGI refresh timer. In general, the soft state in the relay, including the TMGI refresh timer, should be closely tied with the TMGI detection such that the soft state is only generated and kept at relay when the MBMS traffic corresponding to the requested TMGI has been properly conceived. This may ensure that the parameters fetched from the soft state (e.g., refresh timer) and supplied to the remote WTRUs would be viable and applicable for an existing MBMS session.

In order to avoid the growth of soft context at a relay with the number of remote WTRUs served by the relay, as well as reduce the processing load at the relay, the relay WTRU may maintain the soft context on a per TMGI basis rather than a per WTRU basis. In this way, there may be only one TMGI refresh timer for any given TMGI and not for every WTRU. When a particular TMGI is requested for the first time by a remote WTRU, the relay may attempt to detect the requested TMGI. Once detected, the relay may accordingly create a soft context for the TMGI including parameters associated with that given TMGI (e.g., the ProSe layer 2 Group ID, TMGI refresh timer, count of number of remote WTRUs accessing that TMGI through the relay, and the like). The availability of the TMGI may be broadcasted on the PC5 ProSe link by a ProSe relay WTRU, along with corresponding TMGI-specific parameters such as a TMGI refresh timer and ProSe L2 Group ID via a TMGI Broadcast Announcement message. In particular, a comprehensive list of all the TMGIs that are being currently announced and their corresponding refresh timers as well as associated ProSe L2 Group IDs may be included in this same TMGI Broadcast Announcement message.

The TMGI Broadcast Announcement message may be sent by a relay to remote WTRUs using one-to-many ProSe Direct Communication with a default ProSe L2 Group ID that may be allocated specifically for MBMS relaying control messages to be broadcasted to remote WTRUs around the relay. These remote WTRUs may be interested in MBMS access. This default ProSe L2 Group ID may be preconfigured at both the relay WTRU as well as remote WTRUs. It may alternatively be configured at the relay (e.g., provisioned by relay WTRU's ProSe function). It may be subsequently provided to remote WTRUs during relay discovery and selection. In the latter case, the default ProSe L2 Group ID may be appended to WTRU-to-Network relay discovery messages such as the Model A Announcement message and the Model B Response message. If previously solicited by a discoverer (i.e., remote WTRU), it may be included as part of a Connectivity Information attribute of this message.

This same default ProSe L2 Group ID is not restricted for broadcasting the TMGI Broadcast Announcement. It may be exploited for conveying all control messages that need to be received by remote WTRUs for accessing MBMS via the ProSe relay WTRU. In another embodiment, the TMGI Broadcast Announcement message may be piggybacked onto the WTRU-NW relay discovery messages, such that the list of TMGIs together with the refresh timers and Group IDs are incorporated. This may be in the Connectivity Information attribute of the Model A Announcement message and/or the Model B Response message if previously solicited by a remote WTRU.

When a new WTRU needs to access the MBMS related to the same TMGI, it may acquire the TMGI-specific control parameters by listening to the TMGI Broadcast Announcement. If a remote WTRU desires to have the TMGI monitoring and MBMS relaying further extended beyond the duration of a refresh timer, it may decide to send a TMGI monitoring request. Once received, the relay may not create a new context, but may instead update the existing TMGI-specific context by increasing, for example, the TMGI refresh timer, count of remote WTRUs using that TMGI, and other parameters as needed, and in turn, broadcast over PC5 the TMGI Broadcast Announcement message with an updated TMGI refresh timer and ProSe L2 Group ID.

By having a common soft state for all WTRUs accessing same MBMS service with a given TMGI, along with periodically broadcasting the TMGI-specific control parameters, the complexity at the relay may be reduced. In addition, the remote WTRUs may be enabled to listen to MBMS content without necessarily sending a monitoring request explicitly. Each WTRU may still be allowed to send its own TMGI monitoring request in order to have the TMGI refresh timer increased at the relay.

As such, the relay ensures that there is always at least one remote WTRU behind it that is still interested in the TMGI advertised. Thus, the relay may maintain the soft state for that particular TMGI so that it can continue to monitor the TMGI and forward the related traffic. Since the soft state may be specified for a given TMGI, the relay may not need to respond to each remote WTRU individually in order to confirm each request and provide necessary parameters. Rather, it may be sufficient to broadcast the TMGI availability upon detection, together with TMGI-specific parameters, to all of the remote WTRUs at once without having to contact each WTRU separately.

Since the updated TMGI refresh timer in the TMGI Broadcast message is broadcasted to all remote WTRUs at once, many or all of the remote WTRUs may send the same TMGI monitoring request to the relay WTRU once the timer is about to expire. To avoid this sudden and unnecessary rush of requests for timer updates at the same time, a random approach may be employed. In such an approach, each remote WTRU may tune or tweak its own timer by adding or subtracting a random number from the broadcasted timer provided by the relay. In this case, if many WTRUs still need the relay to continue the TMGI monitoring and MBMS relaying, the WTRU with the smallest net timer (after applying the random addition/subtraction) may send its own TMGI monitoring request, first allowing the relay to update the timer and signal it back to all WTRUs while holding back a subset of remaining WTRUs from redundantly requesting for further timer updates.

Figure 12:
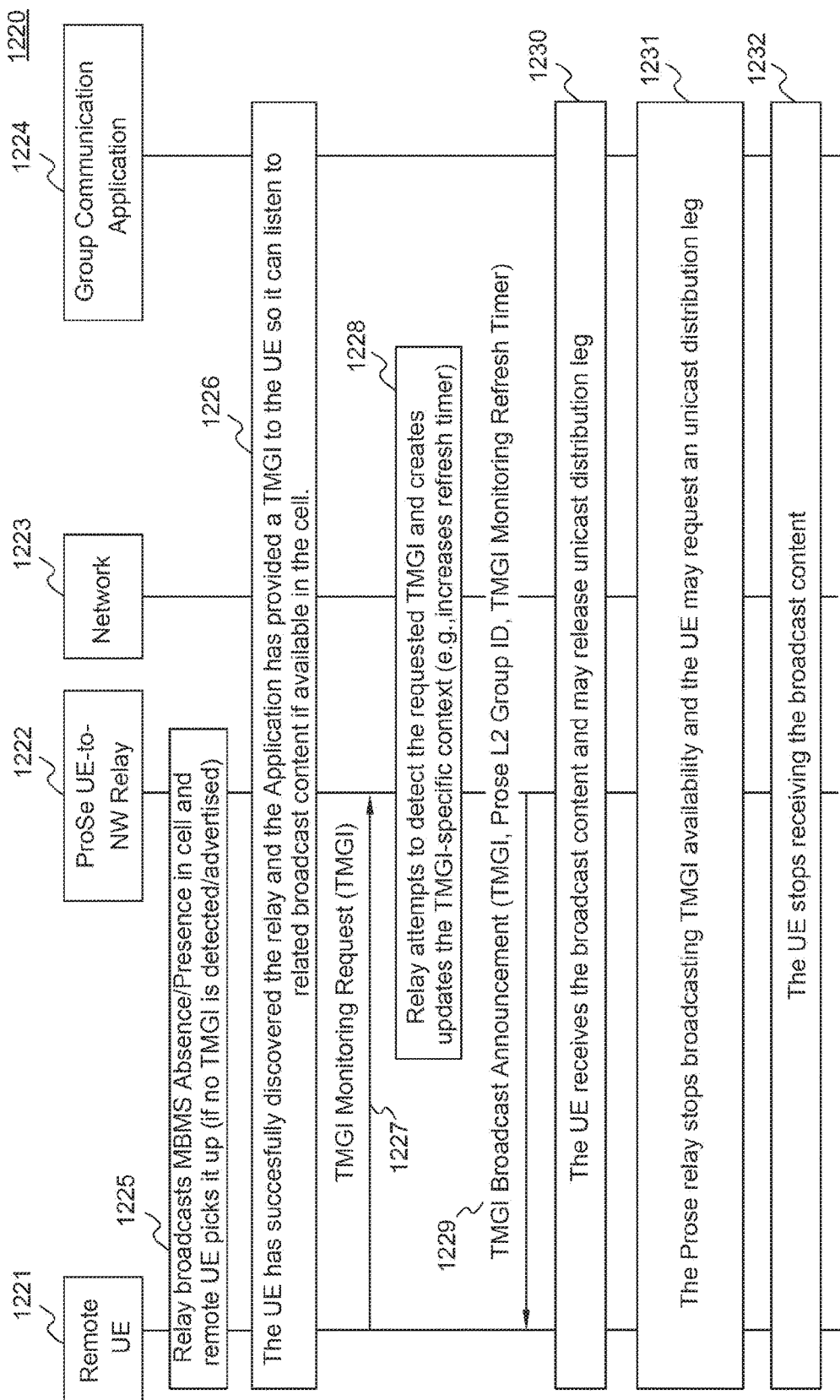
FIG. 12 is a call flow diagram illustrating an example TMGI monitoring procedure.

Referring now to FIG. 12, a call flow diagram 1220 illustrating an example TMGI monitoring procedure is shown. For a remote WTRU 1221 to send a TMGI monitoring request to a relay 1222 that has not started monitoring or announcing any TMGI, it should initially pick up the relay's MBMS absence/presence indication over the broadcast channel to ensure that the relay has indeed perceived MBMS on its serving cell 1225. Then, as opposed to the relay WTRU 1222 responding to each remote WTRU 1221 individually and confirming the receipt of every TMGI monitoring request (i.e., Acknowledgement response per TMGI monitoring request), the relay WTRU 1222 attempts to detect the requested TMGI via its serving eNB 1226. If successful, it creates or updates the TMGI-specific context (e.g., increase the TMGI refresh timer) 1228. Once the soft context is created/updated, the relay then broadcasts the availability of the detected TMGI over PC5 by sending a TMGI Broadcast Announcement, incorporating the corresponding associated TMGI-specific parameters (e.g., TMGI value, ProSe L2 Group ID, TMGI Monitoring Refresh Timer, WTRU count, and the like) 1229. This TMGI Broadcast Announcement may be implemented either using ProSe one-to-many Direct Communication with a Group ID that is particularly dedicated for control messages meant for ProSe WTRUs who are subscribed to MBMS via ProSe WTRU-NW relays, or optionally by carrying the message on top of WTRU-NW relay discovery messages.

Broadcasting the TMGI-specific control parameters along with TMGI value may enable all remote WTRUs 1221 to be supplied with the TMGI-specific ProSe L2 Group ID and refresh timer. This may allow them to readily listen to the corresponding broadcasted MBMS content without the need to necessarily send an explicit request to access the running MBMS session, unless the timer needs to be refreshed.

The WTRU receives the broadcast content, and may release the unicast distribution leg 1230. At some point the ProSe relay may stop broadcasting the TMGI availability and/or the WTRU may request a unicast distribution leg 1231. Finally, the WTRU may stop receiving the broadcast content 1232.

Figure 13:
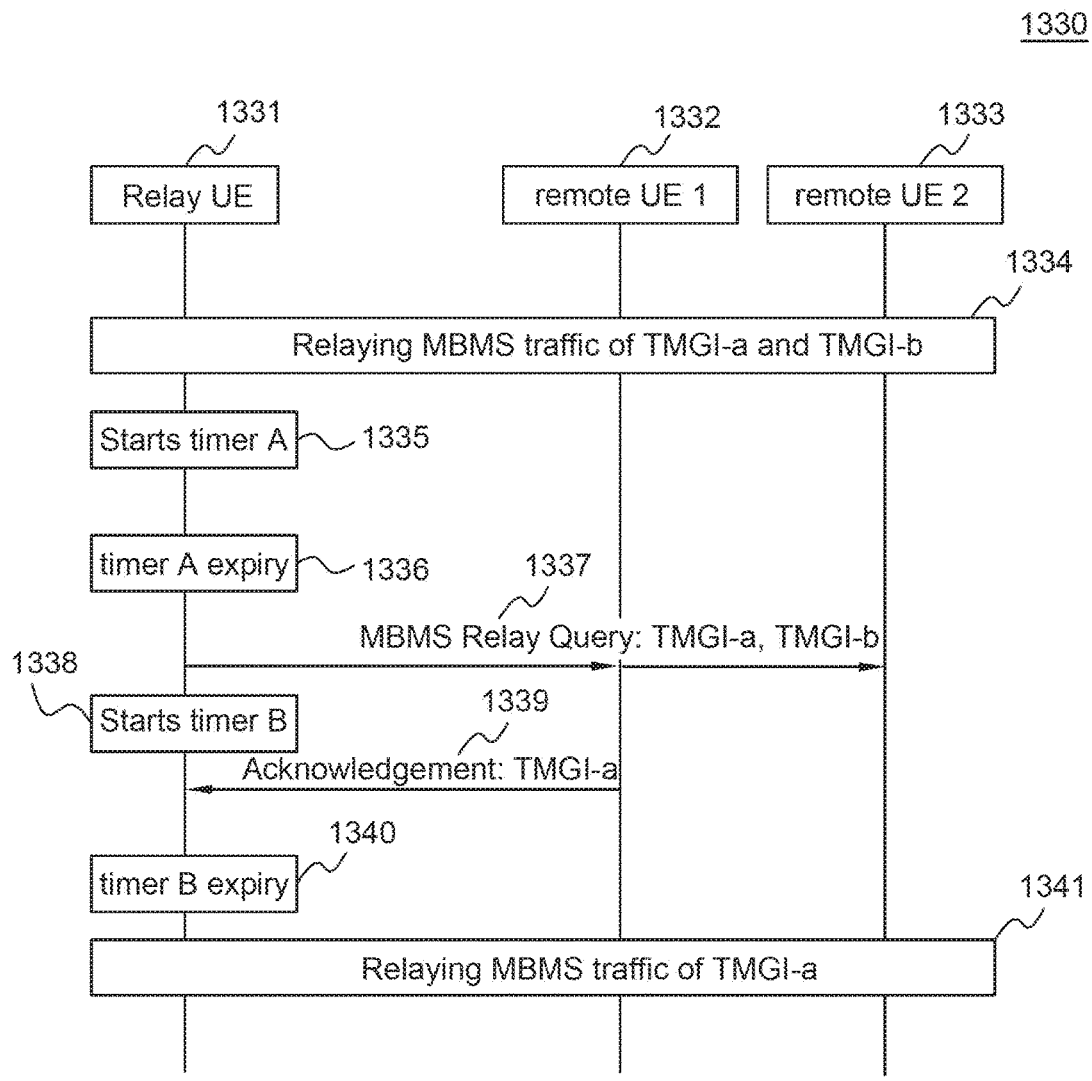
FIG. 13 is a call flow diagram illustrating an example MBMS relay decision flow based on polling.

Referring now to FIG. 13, a call flow diagram 1330 illustrating an example MBMS relay decision flow based on polling is shown. In an embodiment, a Relay WTRU 1331 may decide whether it should continue to relay MBMS traffic for specific TMGI(s) or not. When the Relay WTRU 1331 starts relaying MBMS traffic of a specific TMGI 1334, it may start a timer (e.g., timer A 1335). The timer value may be preconfigured in the WTRU 1331 or configured by the application server. The timer value may be the same for all the TMGIs or may be different for various TMGIs.

When the timer expires, the Relay WTRU 1331 may send a query 1337 to the remote WTRUs 1332, 1333 via one-to-many communication, to determine if there are any remote WTRUs 1332, 1333 still interested in receiving the MBMS traffic of the specified TMGIs. In the query message 1337, the TMGIs in question may be indicated. The relay WTRU 1331 may start another timer (e.g., timer B 1338) waiting for responses from the remote WTRUS 1332, 1333.

Any remote WTRU 1332, 1333, if it is still interested in receiving this MBMS traffic, may respond to the Relay WTRU 1331 with an acknowledgement message 1339. The remote WTRU 1332, 1333 may also indicate the TMGIs that it is interested in, which may be a subset of the TMGIs in the Relay WTRU's query message, in the acknowledgement message. If a remote WTRU 1332, 1333 is not interested in the specified TMGI(s), it may not send a response.

If the relay WTRU 1331 receives any acknowledgement message 1339 for a TMGI(s) before timer B expires 1340, it may continue to relay the MBMS traffic of the TMGI 1341 and restart timer A 1335 that is related to the TMGI. Otherwise, if the relay WTRU 1331 doesn't receive any acknowledgement message for a TMGI 1339, it may stop relaying the related MBMS traffic.

A WTRU acting as a relay node may relay other forms of data, such as data for Earthquake and Tsunami Warning System (ETWS) and data for Public Warning System (PWS). The data for ETWS, PWS, or similar service, may be relayed via the user or control plane. Moreover, the data may be sent to all remote WTRUs using a well-known reserved broadcast destination address that is known to carry ETWS or PWS data. This address may be an IP address and/or L2 address.

In one embodiment, ETWS may be used as an example of a service data that may be also relayed by a relay WTRU in addition to MBMS or other unicast data that has been described above. However, it may also apply to other warning data (e.g., PWS). The use of ETWS may be considered as an example of how the embodiments may be used and is not limited to ETWS only.

A relay WTRU that may be in coverage of the network may receive notifications about ETWS via the system information blocks (SIBs). Upon reception of ETWS notifications over the SIBs, a relay WTRU may announce the same or a subset of the ETWS notifications received from the network. These notifications may not be the actual ETWS data but the indication about their arrival (e.g., scheduling information about the transmission of the actual ETWS). The relay WTRU may send ETWS notifications via a control or user plane channel. This may be used to alert remote WTRUs about the availability of ETWS data in the short future.

A relay WTRU may be preconfigured or be configured via the network (e.g., MME, ProSe Function, eNB, or other higher layer messages like OMA and DM) to treat ETWS notifications and data with a certain priority. Thus, when ETWS data is available, the relay WTRU may treat it accordingly to the configured priority, for example, data with higher priority than other unicast data is relayed. Similarly, remote WTRUs may also have the same configurations that they may obtain via the remote WTRU or that they may have been preconfigured with previously. Thus, when a remote WTRU received ETWS notifications, the remote WTRU may use the notifications as per the configured priority. For example, the remote WTRU may first process the notification message in order to receive scheduled ETWS from the relay WTRU as per the received notification. Remote WTRUs may also "subscribe" to and receive ETWS data upon discovery of a relay WTRU. The request to get ETWS data may be done via the control or user plane or via discovery messages. Thus, a relay WTRU sending notification and ETWS data to remote WTRUs may only occur if the remote WTRU has subscribed to the ETWS service with the relay WTRU. Upon reception of ETWS data, a relay may start forwarding the data to remote WTRUs as per previous scheduling information that was sent to the remote WTRUs, or using preconfigured resources for ETWS data transmission. The transmission may occur over a broadcast channel using a well-known address (e.g., L2 address, IP address) as the destination address, or it may occur via unicast transmission to remote WTRUs that may have subscribed with the relay WTRU to get this information.

In an embodiment, the relay may configure the remote WTRUs with a specific schedule when ETWS/CMAS messages are scheduled to be transmitted. For example, the ETWS and CMAS may be scheduled on certain reserved frames, and the relay may broadcast the frame number as a DFN offset number. For example, offset from DFN #0. The relay may also broadcast the frame number as a DFN pattern. For example, x is provided such that DFN mod x=0.

In an embodiment, the remote WTRU may request the relay to forward system information block (SIB) information during the registration procedure. The request message may indicate the WTRU preference parameters. For example, the SIBs the WTRU is interested in, the wake-up cycle of the WTRU (e.g. pre-provisioned wake-up cycle parameters), the services the WTRU is using or subscribed to (e.g. MBMS service needs MBMS SIB parameters), and the like.

The relay WTRU may respond with an acknowledgement message with optional configuration parameters to indicate the SIB transfer mechanism. The SIB transfer mechanism may include the schedule with which the SIBs are forwarded. For example, the SIBs may be forwarded on reserved frames, and the relay WTRU may indicate the DFN offset number of the DFN pattern when the SIBs are transmitted.

In order to support different WTRUs with different wake-up cycles, each forwarded SIB may be repeated multiple times with a predefined repetition sequence. The relay may provide the SIB scheduling information in the relay broadcast channel. For example, the relay may indicate which SIB along with a DFN pattern to indicate the repetition sequence. The relay may take into account the wake-up cycle of the WTRUs in choosing the DFN pattern. The relay may update the DFN pattern when remote WTRUs join or leave the relay. For example, this information may be transmitted in the SL-master information block (MIB) message.

The relay WTRU may maintain a SIB update flag that may be set when there is a change in a SIB, or when a new SIB is transmitted. The SIB update flag may be transmitted in the SL-MIB message. The SIB update flag may indicate the status of the SIBs in the duration between the transmissions of two SL-MIB messages.

A remote WTRU that has just joined the relay and desires to read the relay SIBs should first acquire the SL-MIB message to obtain the transmitted SIBs and the SIB schedule to know how it can acquire the SIBs. A remote WTRU, already registered with the relay, may monitor the SIB update flag in the SL-MIB message, and acquire the SIBs if there is a change in the SIB indicated.

It should be noted that the above methods for forwarding ETWS/CMAS SIB information may be used for forwarding other SIBs as well.

A WTRU acting as a relay node may use a set of new establishment causes when it requests connection towards the network. The establishment cause used by a relay node when requesting a connection to forward UL data from remote WTRUs may be different from that used by the relay node when it wants to send data generated by the relay WTRU itself. The relay WTRU may use a different cause and it may depend on different factors. For example, the data or application type received from the remote WTRU, the group ID that the remote WTRU belongs to, the signaling priority received from the remote WTRU, the identity of the remote WTRU (e.g., WTRU ID, ProSe WTRU ID, source L2 ID, and the like), the addressing information of the destination to which the data is to be sent (e.g., IP/port of the destination AS). The establishment cause may be associated with a certain priority handling at the network and based on the signaled cause, the eNB may apply a different priority when handling the connection request from the relay WTRU.

A relay WTRU may receive an indication from the network to reduce data rate from the remote WTRUs that it is serving. This indication may be sent in a new or existing NAS or RRC message, or any other higher layer messages (e.g., ProSe layer signaling), or through other methods. The indication may also be implicit when the relay WTRU itself receives a congestion control indication such as existing mobility management or session management (e.g., APN based) back off timers. These methods, implicit or explicit, will be further referred to as congestion notification.

Upon reception of congestion notification from the network, a relay WTRU may in turn notify the remote WTRUs about the congestion notification. This may be done over control or user plane as described previously. Moreover, it may be broadcast or sent in a unicast manner to all remote WTRUs that are being served by the relay WTRU. The relay WTRU may indicate some information to the remote WTRUs which may include, for example, the type of congestion control (e.g., whether it applies to data or signaling), and the time during which the congestion control should be respected (e.g., a back off (BO) timer). The relay WTRU may provide a BO timer that is at least the same length of that received from the network. In addition, the PLMN ID from which this BO was received, whether or not the WTRU is allowed to reselect to another relay WTRU, the application or group ID that this congestion affects or whether it applies to all applications or group ID that a remote WTRU belongs to, may be also included.

A relay WTRU may send congestion notification if the relay experiences high load from the remote WTRUs even if no congestion notification was received from the network. The relay WTRU may provide different lengths of BO timers individually to remote WTRUs so that when the remote WTRUs re-connect they do not cause a sudden surge of load in the relay WTRU.

When a remote WTRU receives a congestion notification from a relay WTRU, the remote WTRU may take actions. For example, the remote WTRU may start congestion control as indicated by the notification. The congestion control may be for signaling or data, or both. For instance, the relay WTRU may stop sending any UL data to the relay WTRU. Alternatively, based on the congestion type, the relay WTRU may send data but may not request QoS parameters or may not send control plane information to the relay WTRU.

In another example, the remote WTRU may start a timer that is associated with the received congestion notification. The relay WTRU may not send data or control information until the timer expires or until an indication is received from the relay WTRU that congestion is alleviated.

The relay WTRU may start discovery and reselection to another WTRU if this is allowed as per indication from the relay WTRU or as per local configurations in the remote WTRU. For example, a reselection is only allowed if the signaled PLMN ID from a new discovered relay WTRU is different from that received from the relay WTRU that sent the congestion notification.

The remote WTRU may stop sending data or control information for the certain group ID, application ID, or destination IP/port that is associated with and included with the received congestion notification.

When congestion is alleviated in the relay WTRU (e.g., when an existing BO timer expires), or when the relay stops an existing BO timer, for which a previous congestion notification was sent to other remote WTRUs, the relay WTRU may inform remote WTRUs the alleviation of congestion. The alleviation may be done partially, for example, the relay WTRU may indicate that data can be sent but no control plane messages are allowed, or both user plane and control plane data may be sent. The relay WTRU may send the notification about congestion alleviation using the same manner proposed above for sending the congestion notification and include the details for which the alleviation is related to (e.g., user vs control plane messages now allowed, whether reselection to another relay WTRU is now allowed, and the like).

Upon reception of a message regarding congestion alleviation, the remote WTRUs may take actions as indicated in the message. For example, the remote WTRU may stop a BO timer associated with the message. The remote WTRU may start sending user or control plane messages to the relay WTRU that is allowed as per the indication. The remote WTRU may be allowed to reselect to another relay WTRU if discovered.

As discussed above, the user priority may need to be upgraded or downgraded dynamically based on the current situation of the WTRU, user or the group the user is part of. The network specific eNB may need to be informed about the change in priority of the WTRU so that appropriate resources may be assigned to the WTRU by the eNB for such high priority communication.

The priority level of the WTRU may follow one of the following two options depending on the availability of a ProSe Function to the MME interface. In the first option, where the ProSe Function to MME interface exists, the application and the ProSe Protocol in the WTRU may determine that the ProSe communication needs to use a higher priority depending on the dynamic attributes of the either the communication group or the user. The WTRU may send this new priority information to the ProSe Function over the PC3 interface. The ProSe function may be determined based on the subscription information received from the HSS and may also be checked with the application server (e.g. MCPTT server) to determine if the priority requested by the WTRU is required over the PC2 interface. This check with the application server (AS) may be the confirmation of a disaster scenario indicated by the WTRU in the PC3 message to the ProSe function.

Alternatively, whenever the AS or MCPTT server has knowledge of a change in the dynamic group priority or user priority, it may indicate such a change to the ProSE function. The ProSe function may then determine the new priority level of the WTRU.

In both options described above, the ProSe function may send the new priority information to the MME over the direct interface between the ProSe function and the MME. This information may be sent in the QCI number, which may already be understood by the MME, or the level of priority, (e.g., low, medium, high, urgent, extremely urgent, emergency, and the like). The MME may covert these levels to QCI, allocation and retention priority (ARP), or guaranteed bit rate (GBR) values and may send them to the WTRU or eNB as part of the WTRU's context. The ProSe function may use an international mobile subscriber identity (IMSI) as the WTRU's identification to send the priority information to the MME as the ProSe ID may not be understood by the MME especially the MME in the visitor public land mobile network (VPLMN).

In the second option, where no ProSe function to MME interface exists, the determination of the priority level may be performed in a similar manner as described above. Once the priority level is determined at the ProSE function it may update the HSS subscription profile of the WTRU using the PC4 interface. This dynamic change in the HSS profile of the WTRU may trigger the HSS to send an "insert subscription data" message to the serving MME of the WTRU with the new priority level of WTRU. For example, the HSS sends this message to the MME whenever there is a change in the subscription profile of the WTRU. The MME may then send this priority level to the eNB as part of WTRU's context.

Location information transfer via PC5 based on requested information type is described herein. It should be noted that the following description may apply to all WTRUs or UEs, and hence the term "WTRU" and/or "UE" may be used. Furthermore, the WTRU may be a WTRU that is capable of supporting ProSe services, or a WTRU that is capable of supporting public safety services with or without a ProSe framework, or a WTRU that is a remote WTRU, or a WTRU that is capable of serving the function of a WTRU-to-network relay or a WTRU-to-WTRU relay. It should also be noted that both WTRU-to-network relays and WTRU-to-WTRU relays may both be generically referred to as a relay WTRU. Furthermore, a WTRU may be capable of any combination of the above, e.g., a public safety WTRU capable of being a remote WTRU and a relay WTRU.

An embodiment for location information retrieval between WTRUs is described herein. The requesting WTRU may indicate the type of location retrieval method or location computation method that should be used by the receiving entity (e.g. a receiving WTRU). Furthermore, other requests/indications such as whether previously computed location information may be used by the receiving entity (e.g. the receiving WTRU) if the time of computation did not exceed a preconfigured or an indicated time window, may be used.

Alternatively, the requesting WTRU may also indicate that a time-stamp be reported back with the location information, where the time-stamp may indicate the approximate or precise time when the location information was computed. This method may be referred to as location information request, however, this is just an example and is not intended to be limiting. Alternatively, any existing message may be used such that it may include new or updated elements to enable this procedure.

A WTRU may get a message indicative of a procedure to compute and report location information. The receiving entity (e.g., the receiving WTRU) may compute the location information as per the requested procedure that is indicated in the message, and may optionally save the time at which the location information is computed. The WTRU, after computing the location information, may transmit a message to provide its location information. The message may also contain an indicator for the type of method used to compute the location information or the type of location information retrieval method used. Moreover, the response may include a time-stamp indicating an estimated or precise time of computation or retrieval of location information. The WTRU may transmit this message to the entity that may have requested this information using the known address (IP and/or layer 2) of the requesting WTRU.

It should be noted that the term "retrieval" or "computation" may refer to the same thing and may therefore be used simultaneously. The response may be sent in a new location information response or location information report. Similarly, an existing message may also be used to achieve the same purpose.

The location information request will now be described in more detail. A WTRU (e.g., an out-of-coverage remote WTRU) may be configured or triggered to send a request for location information of another peer WTRU (e.g., relay WTRU) by sending a location information request message. This location information request message may be sent over the PC5 air interface. The following triggers, described below, may cause a WTRU to send this message.

The user may interact with the device's display such that the user requests the WTRU to send this message. Optionally, the interaction may be with an application client in the WTRU which in turn may trigger the WTRU to send this request.

An application running on the WTRU may request the WTRU (e.g. the lower layers such as the ProSe layer, NAS, RRC, and the like) to send this message. The application layer may do so after it fails to get location information from the network or after the lower layers in the WTRU (e.g. the lower layers such as the ProSe layer, NAS, RRC, and the like) fail to provide location information, or location information that is computed in a specific manner as requested by the application client. Alternatively, the application may request the WTRU send this message if the user interacts with the application such that the user requests this information.

The WTRU may send this message if it fails to get this information from the network, optionally after a specific time elapses.

The WTRU may send this information after the WTRU fails to retrieve this information using a specific retrieval method, optionally after a certain time elapses. For example, a WTRU may send a location information request after the WTRU fails to get SUPL or GPS location information. Optionally, the WTRU may send this information after a certain preconfigured time elapses without success in retrieving location information possibly computed.

A WTRU may send a location information request if the WTRU fails to receive GPS signals or if an error is reported from the GPS component in the WTRU, optionally after a specific time elapses.

A WTRU may send a location information request when it receives an explicit request to do so from another entity e.g., a ProSe Function, an application server, an eNB, MME, or any other network node.

A WTRU may send a location information request when the WTRU starts operating as a relay WTRU or as a remote WTRU.

A WTRU may include any of the following items described below in a location information request. For example, the location information request may include a request type. This information element (IE) indicates the desired type of location information that should be computed or retrieved by the recipient. For example, this IE may include {Cell ID, GPS, SUPL, other}. It should be noted that this list is serving as an example and does not aim to limit the retrieval methods to the listed examples only. Note that this IE may actually include more than one method. If so, the WTRU may also include a priority associated with each method. Alternatively, the list may implicitly reflect a certain priority level per method. For example, {SUPL, GPS, Cell ID} may indicate that SUPL is desired first, however if not available, then GPS may be used, and finally if not available then Cell ID may be used. This is only one possible example, and is not intended to be limiting.

The location information request may also include a request lifetime which indicates the time that the request is valid, i.e., the maximum time by which the location information should be computed or reported. Note that this time may be preconfigured in the WTRU or may be requested by the user or the application client in the WTRU.

The location information request may also include an a-priori information indication with a time window that specifies whether previously computed location information may be used by the receiving entity (e.g., the receiving WTRU) given the time of computation did not exceed a preconfigured or an indicated time window.

The location information request may also include an application ID referring to the application that triggered the request. This may be specified information or it may vary per area, PLMN, or user, and the like.

The location information request may also include higher layer information, which may be defined as information related to a user, e.g., the name of the user, or the user name of a specific application. For example, if the user requests the WTRU to send this location information request, the user may also input this information. As another example, if the request to send this message comes from the application in the WTRU, the application client may also provide the application user name or any other application layer identity.

Location information computation and reporting will now be described in more detail. A WTRU may compute location information, optionally using an indicated/requested method type or a configured method, and send this information in a location information response message. The location information may be readily available at the WTRU, manually inputted by the user, derived from SUPL platform, fetched from a wireless communication system entity (e.g., eNB, HSS, etc.), and the like. The location information response message may also contain a time-stamp indicating when this location information was computed. Furthermore, the message may contain a computation method that indicates the method used to compute or retrieve the location information.

A WTRU may send a location information response message (or any other message with the proposed IEs) when any of the triggers described above occur. For example, the WTRU may send this message when the application client in the WTRU requests the WTRU to do so, or when the user interacts with the WTRU and requests the WTRU to send this message. Furthermore, a WTRU may send this message when the WTRU receives a location information request message, optionally from another WTRU, or when the WTRU receives any explicit request to send this message from another network node (e.g., a ProSe Function, an eNB, an MME, an application server, or the like).

The triggers described above for location information reporting and possibly computation/recalculation (e.g., reception of location information request) may optionally demonstrate a bulletin/message on the WTRU with the requesting WTRU's higher layer information (e.g., WTRU ID, IP or L2 address) to first pledge for the user's permission or grant to have its location information returned back to that specific requesting WTRU.

It should be noted that when any of the above triggers occur, the WTRU may first compute or retrieve location information using an indicated method included in the request or as per a preconfigured method, optionally a prioritized list of computation methods that the WTRU uses based on the available methods. In other words, if the WTRU fails to compute its location information based on the indicated location information type for any reason (e.g., indicated type of location information is not supported, SUPL server is not responding, GPS unavailable, or the like), the WTRU may simply compute the location based on a default list of configured type(s) that may be prescribed in order of priority. For example, a WTRU may be configured (either preconfigured or as per an explicit indication in a received request) to use {SUPL, GPS, Cell ID, etc} for computation of location information. The WTRU may first attempt to compute location information based on SUPL. If not available, the WTRU may then use GPS, and so on. In this case where the information type of computed location is different from the type indicated in the received location information request message, the WTRU may indicate the type of location information associated with the supplied location.

The WTRU may respond with information it has already computed and it may do so based on a pre-configuration or based on an indication in an optionally received request (e.g., this indication may be part of a location information request that may have been received by the WTRU). If the WTRU's already available current location information is outdated based on requested/indicated time window, it may recalculate and refresh its location information.

When sending a location information response, a WTRU may include any of the previously described information, e.g., time-stamp, higher layer information, application ID, and the like.

A WTRU may report to another network node, e.g., a ProSe Function, or application server, eNB, MME, or the like, that a location information response has been sent, optionally to a specific recipient. A WTRU may count and save the number of location information requests sent or the number of location information requests received or the number of location information responses sent or the number of location information responses received. The WTRU may report this information to any other network node and also include any of the received IEs in the received or transmitted messages.

Embodiments for overall location information retrieval and transport options are described herein.

Figure 14:
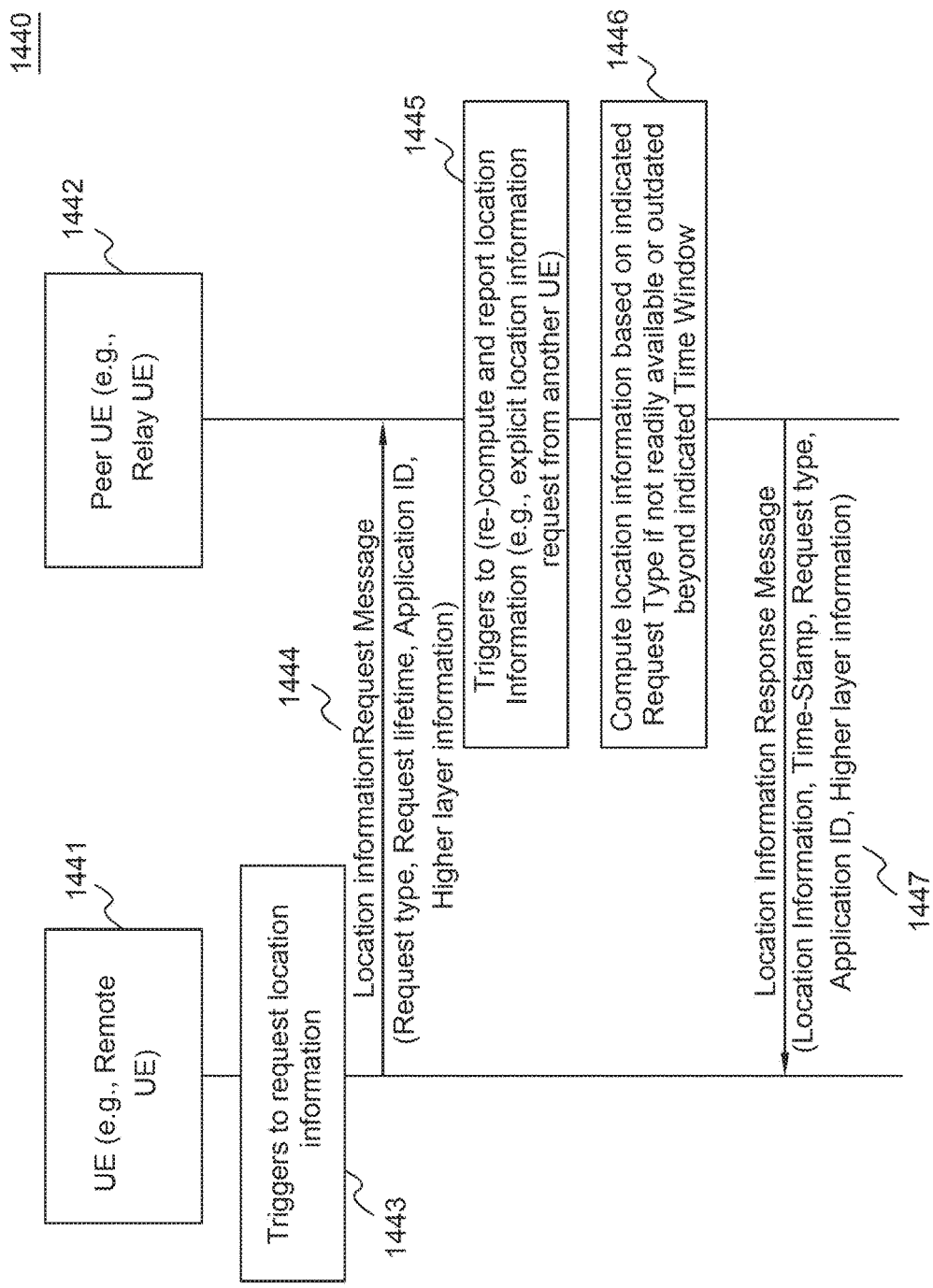
FIG. 14 is a diagram of an example call flow of a direct location information transfer based on requested information type.

Referring now to FIG. 14, a diagram 1440 of an example call flow of a direct location information transfer based on requested information type is shown. In an embodiment, a WTRU 1441 may be triggered to request location information of another WTRU 1443 according to the described potential list of triggers. The WTRU 1441 may transmit a location information request message 1444, including request type, request lifetime, application ID, higher layer information and other requests/indications (e.g., accepting previously computed location information within a given time window) as previously described.

A WTRU 1442 may also be triggered to (re-)compute and report location information 1445 according to triggers described above, for example, an explicit location information request from another WTRU, or the like. The computation of the location information 1446 may be done based on the request type, request lifetime and other preferences as indicated in the location information request. The WTRU 1442 may then report its computed location information 1447, along with other possible parameters such as timestamp, request type, application ID, higher layer information, etc., to the requesting entity (e.g., the requesting WTRU) or any other node as depicted by trigger.

The location information request/response messages 1444, 1447 may be carried using the PC5-S signaling protocol option for Rel-13 Public Safety discovery and other eProSe-Ext functionality. For example, the location information request/response messages may be integrated within Model B Solicitation and response messages respectively for WTRU-network relay discovery, or group member discovery or WTRU-to-WTRU relay discovery. Other possible options may be direct one-to-one communication request and authentication messages using Layer-2 IDs of WTRUs, or cell ID announcement request/response messages, and the like. Alternatively, the messages may be transported using the PC5-D control plane for non-Public Safety discovery (e.g., PC5 Discovery messages), or even via the PC5-U user plane for ProSe Communication.

Secondary relay information retrieval through a primary relay is described herein.

The remote WTRU may be configured or triggered to request the relay WTRU it is currently connected to (e.g., the primary relay WTRU) to discover and report other relay WTRUs (secondary relay WTRUs) on its behalf. This may be done by sending a secondary relay discovery request message over the PC5 air interface. Any one of the following triggers described herein may be used to cause a WTRU to send this message.

A remote WTRU may decide to send this message if it fails to find the suitable desirable connectivity information (e.g., APN information, PDN type, or the like), group information (e.g., ProSe Layer 2 Group ID, or the like), TMGI or other possible information, either in general or within the already discovered relay WTRUs (i.e., primary relay WTRUs). They may be done after a specific time elapses.

A WTRU may send a secondary relay discovery request when the WTRU starts losing its connection to an already discovered primary relay WTRU, or due to bad quality of the link to the primary relay, as measured by the remote WTRU.

A WTRU may send a secondary relay discovery request when it receives an explicit request to do so from another entity, e.g., a ProSe Function, an application server, an eNB, MME, or any other network node.

This request may be triggered by the user, where the user may optionally interact with the device's display such that the user requests the WTRU to send this message. Optionally, the interaction may be with an application client in the WTRU which in turn may trigger the WTRU to send this request.

An application running on the WTRU may request the WTRU (e.g., the lower layers such as the ProSe layer, NAS, RRC, and the like) to send this message.

Consequently, the remote WTRU may then transmit the secondary relay discovery request message. The secondary relay discovery request message may include a ProSe WTRU ID, which is a link layer identifier that is used to identify the requesting remote WTRU for direct communication.

The secondary relay discovery request message may also include connectivity details, which specify what the remote WTRU is specifically looking for in secondary relays such as APNs, communication group IDs, TMGIs, QCIs supported, services offered such as MBMS or IP multicast or any other relay information that may be broadcasted by Relay UEs.

The secondary relay discovery request message may also include a request lifetime, which may indicate the time that the request is valid, i.e., the maximum time by which the secondary relay information should be reported. It should be noted that this time may be preconfigured in the WTRU or may be requested by the user or the application client in the WTRU.

The secondary relay discovery request message may also include an a-priori information indicator with a time window which specifies whether previously determined secondary relay information may be used by the relay WTRU given that the elapsed time since discovering those secondary relay WTRUs did not exceed a preconfigured or an indicated time window.

The secondary relay discovery request message may also include a list of already discovered relay WTRUs the remote WTRU has already discovered, e.g., in terms of ProSe Relay IDs, so that the primary relay WTRU may then avoid sending back information the remote WTRU already has.

The secondary relay discovery request message may also include a location information request, wherein the remote WTRU may additionally seek the location information of the secondary relay WTRUs optionally by using the location information retrieval procedure described heretofore.

The secondary relay discovery request message may also include higher layer information that may refer to the information related to a user, e.g. the name of the user, or the user name of a specific application. For example, if the user requests the WTRU to send this secondary relay discovery request, the user may also input this information. As another example, if the request to send this message comes from the application in the WTRU, the application client may also provide the application user name or any other application layer identity.

The secondary relay discovery request message may also include an application ID that may refer to the application that triggered the request. This may be specified information or it may vary per area, PLMN, user, or some other criteria.

The relay WTRU may be configured or triggered to report a list of other relay WTRUs that have been previously discovered by the relay WTRU, based on a trigger. For example, the trigger may be when the relay WTRU receives a secondary relay discovery request message. This message may be from another WTRU. In another example, the trigger may be when the relay WTRU receives any explicit request from another network node (e.g., a ProSe Function), an application server, an eNB, or the like.

In another example, the trigger may be when the application client in the relay WTRU requests the WTRU to do so, or when the user interacts with the WTRU and requests the WTRU to discover secondary relay WTRUs. In another example, relay discovery may be triggered by the user directly, where the user may optionally interact with the device's display such that the user requests the WTRU to discover other relays. Optionally, the interaction may be with an application client in the relay WTRU which in turn may trigger the relay WTRU.

The relay WTRU may initiate a relay discovery procedure (e.g., applying public safety direct discovery procedures) to discover other relay WTRUs that specifically meet the requested specifications (e.g., to satisfy indicated connectivity details, a priori information indicators, location information requests, and the like) and accordingly update its list of discoverable relay WTRUs, if needed.

If applicable secondary relay information is readily available at the primary relay WTRU upon triggering (e.g., upon reception of a secondary relay WTRU request), and the a-priori information indicator allows usage of already existing information within requested time window, the information may be supplied without the need for further relay discovery. In this case, the relay WTRU may report back the secondary relay WTRUs that have been discovered within the requested time window. If the time window is not specified, the primary relay WTRU may be preconfigured with a timer which keeps track of the time when its list of discovered secondary relay WTRUs was last updated. If the timer was expired prior to the onset of any of the above triggers (e.g., before reception of the secondary relay discovery message), the relay WTRU may choose to initiate the relay discovery procedure to update the list of relay WTRUs discovered upon trigger.

If the timer has not expired, the primary relay WTRU may avoid initiating a relay discovery and instead directly send a secondary relay discovery response back to the remote WTRU, incorporating the list of secondary WTRUs it has already discovered. If additionally requested as part of a trigger, location information retrieval may be performed to obtain location information of the secondary relay WTRUs at the primary relay WTRU by using the location information retrieval procedure described above.

The primary relay WTRU may then forward the secondary relay discovery response. The secondary relay discovery response may include the primary relay WTRU's own ProSe Relay WTRU ID to be used as a link-layer identifier for direct communication. The secondary relay discovery response may also include a list of secondary relay WTRUs that the primary relay WTRU ID has discovered (e.g., a list of ProSe relay IDs) and associated corresponding retrieved information for each Relay WTRU (e.g., connectivity details, group information, status/maintenance flag, location information, and the like). This list may exclude the relay WTRUs that were initially discovered by the remote WTRU and indicated in the request in the list of already discovered relay WTRUs. The secondary relay discovery response may also include a timestamp which identifies when the secondary relay information was last retrieved.

The above triggers for secondary relay information reporting and/or computation/recalculation (e.g., reception of a secondary relay discovery request) may optionally demonstrate a bulletin/message on the primary relay WTRU's device with a requesting WTRU's or entity's higher layer information (e.g., WTRU ID, IP or L2 address) to pledge for the user's permission or grant to discover other relay WTRUs and supply back the information to that specific requesting WTRU or entity.

The primary relay WTRU may send this secondary relay discovery response even if it did not discover any secondary relay WTRU. It may leave its fields blank in this case. Alternatively, it may simply not respond at all. The requesting remote WTRU may implicitly infer that the primary relay WTRU could not discover more relay WTRUs than what the remote WTRU included in its request as already discovered relay WTRUs.

An overall secondary relay discovery procedure and transport options are described herein.

Figure 15:
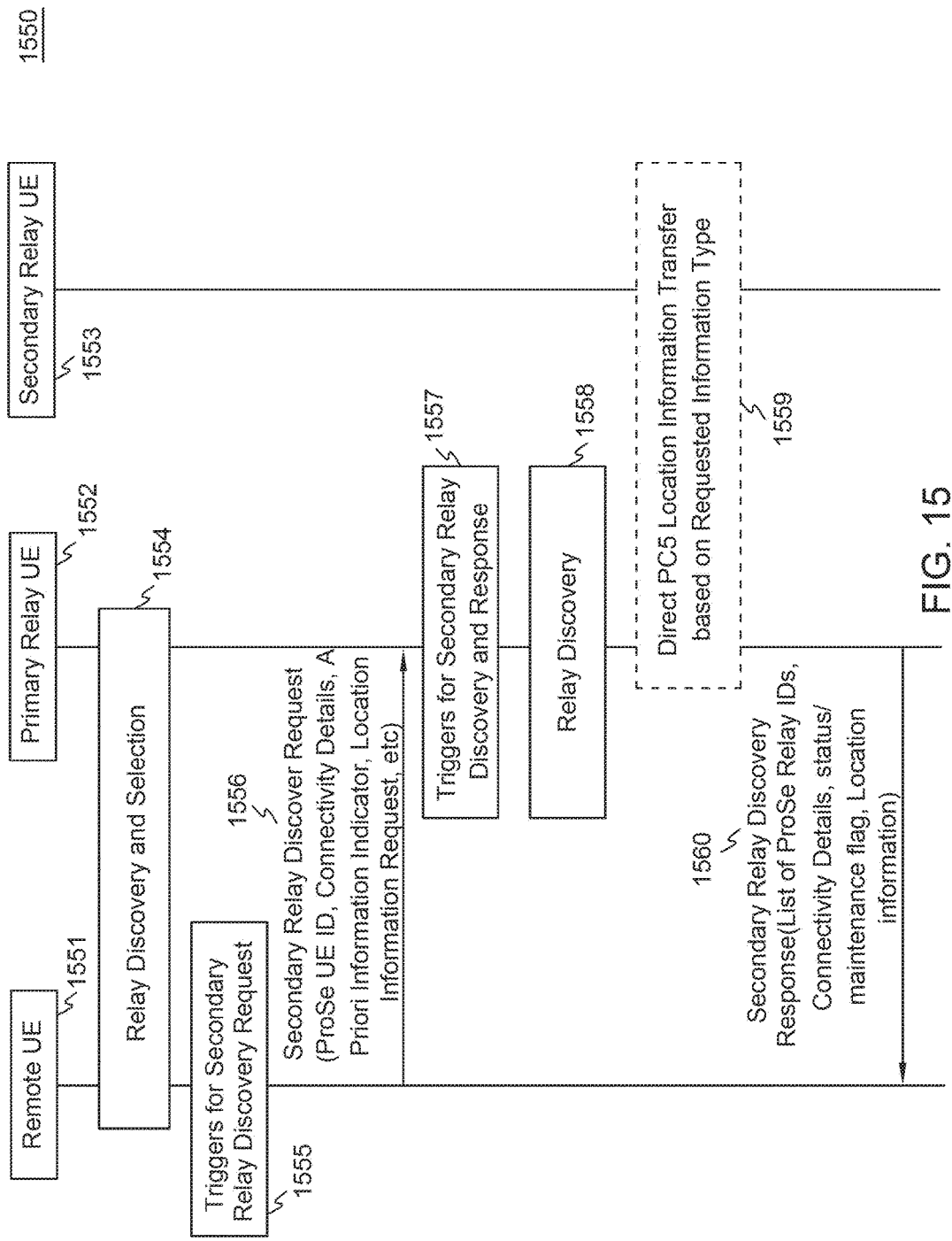
FIG. 15 is a diagram of an example call flow of a secondary relay discovery procedure.

Referring now to FIG. 15, a diagram 1550 of an example call flow of a secondary relay discovery procedure is shown. In an embodiment, a remote WTRU 1551 may discover and selects its primary relay WTRU 1552 through relay discovery procedures 1554. The remote WTRU 1551 may be triggered to request its primary relay WTRU 1552 for the discovery and reporting of secondary relay WTRUs 1553. This may be accomplished by using any one of the aforementioned list of triggers (e.g., the WTRU fails to discover a relay WTRU with desirable connectivity information or due to a bad connection with a primary relay WTRU). Upon trigger 1555, the remote WTRU 1551 may transmit a secondary relay discovery request message 1556, including its ProSe WTRU ID, connectivity details, request lifetime, a-priori information indicator with optional time window, location information request, list of already discovered relay WTRUs, higher layer information, application IDs, etc., as previously defined. The Secondary Relay Discovery Request message may trigger the primary relay WTRU 1552 to trigger a Secondary Relay discovery and response procedure 1557. Provided a Secondary Relay is discovered at 1558, the Primary Relay WTRU may send a PC5 Location Information Transfer, based on the Secondary Relay Discovery Request message 1556, to the secondary relay WTRU 1550, at 1559.

Finally, the primary relay WTRU 1552 may report a list of other relay WTRUs that have been previously discovered by the relay WTRU according to the triggers described above, for example, an explicit secondary relay discovery request from a remote WTRU or another network node. Based on requested preferences in the trigger, the relay WTRU may provide a list of ProSe Relay WTRU IDs of discovered secondary relay WTRUs that match the requested criteria, along with their corresponding retrieved information (e.g., connectivity details, group info, status/maintenance flag, and location information if additionally requested) and other possible parameters such as timestamp, application ID, higher layer information, and the like, to a requesting entity (e.g., requesting WTRU) or any other node as depicted by a trigger 1560.

The secondary relay discovery request/response messages 1556, 1560 may be carried using the PC5-S signaling protocol option for public safety discovery and other eProSe-Ext functionality. Alternatively, the messages 1556, 1560 may be transported using the PC5-U user plane for ProSe communication based on ProSe Layer-2 IDs.

Optimizations to service continuity by the relay node connecting to a remote WTRU PGW are described herein.

Figure 16:
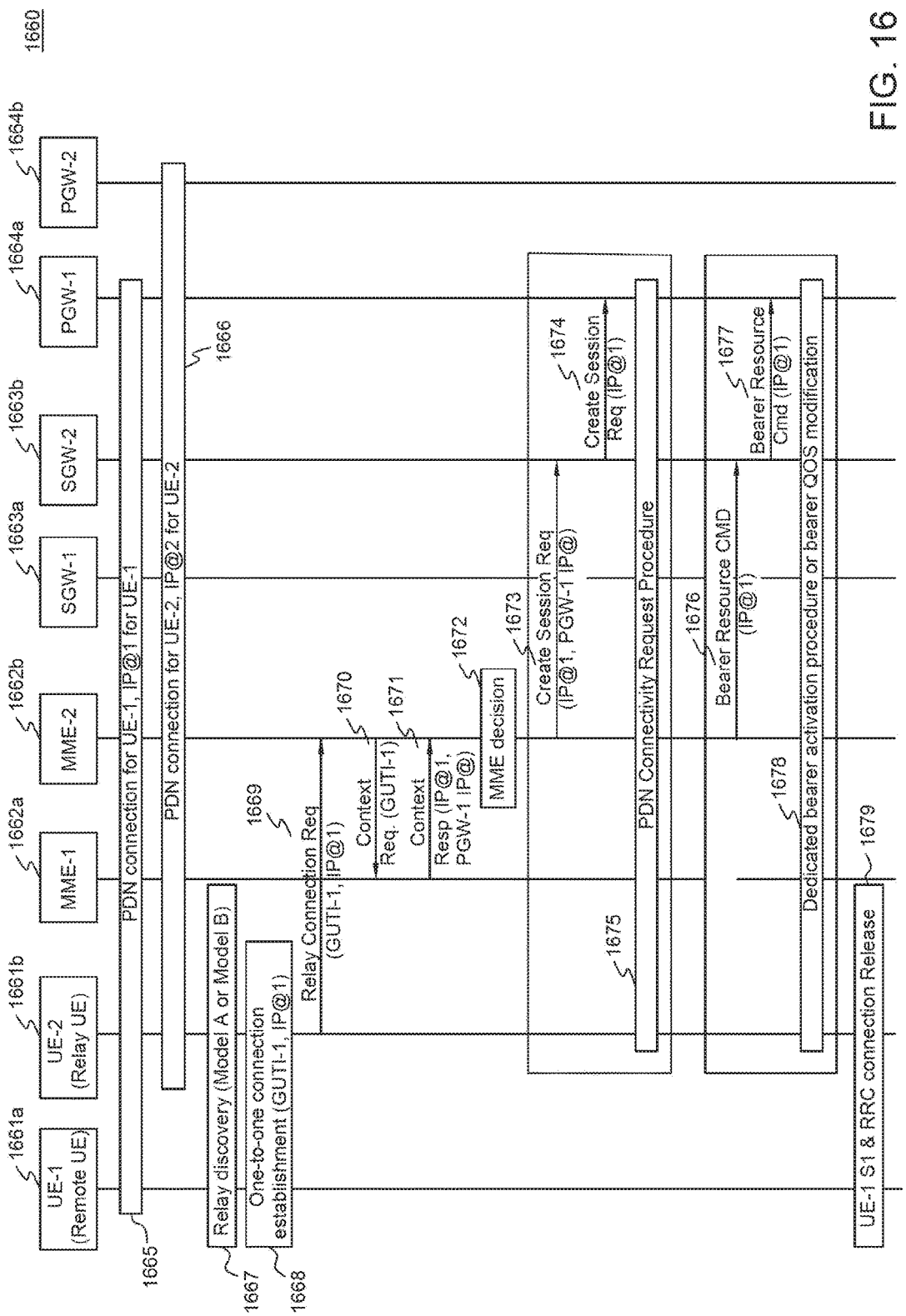
FIG. 16 is a diagram of an example call flow for selecting service continuity options.

Referring now to FIG. 16, a diagram 1660 of any example call flow for selecting service continuity options is shown. In an embodiment, a relay node 1661b may not request a MME 1662a, 1662b to send an indication of whether the remote WTRU 1661a is connected to the same PGW 1664a, 1664b or a different PGW 1664a, 1664b. In other words, an indication for the relay node 1661b to either request a new PDN connection for the remote WTRU 1661a or modify existing bearer/PDN connections may not be sent.

Instead, the remote WTRU 1661a may send a NAS message, such as a session management message (Relay Connection Request), which includes the GUTI and IP address of the remote WTRU 1661a. The MME 1662a, 1662b may decide, based on these received IEs (i.e., GUTI and IP address of the remote WTRU 1661a) whether a new PDN needs to be established (if a remote WTRU 1661a and relay WTRUs 1661b are connected to different PGWs 1664a, 1664b) or whether an existing relay WTRU bearer may be modified (if a remote WTRU 1661a and relay WTRU 1661b happen to be connected to the same PGW 1664a, 1664b). The MME 1662a, 1662b may therefore follow the steps depicted to execute either of the procedures.

After performing relay discovery 1667 and one-to-one ProSe communication connection establishment 1668, the relay WTRU 1661b may send a session management NAS message, such as a relay connection request 1669 to its MME 1662b. This message may include the GUTI and IP address (GUTI-1 and IP@1) of the remote WTRU 1661a.

If the MME 1662a of the remote WTRU 1661a is different from the MME 1662b of the Relay WTRU 1661b, optional step 1670 and step 1671 may be executed to retrieve the remote WTRU's context (IP@1, PGW-1 IP@) from the remote WTRU's MME 1662a.

The MME 1662b may then compare the PGW identities of the relay WTRU 1661b and the remote WTRU 1661a and then may make a decision to either proceed with 1673 to 1675 or otherwise follow 1676 to 1678. The MME decision may be based on retrieving the PGW identities from both the remote WTRU and the relay WTRU context and/or the IP address of the each of these WTRUs. FIG. 13 is a diagram of the decision flow at the MME. may be executed if the MME decides to establish a new PDN connection for the remote WTRU connection. 1676-1678 may occur if the relay WTRU's MME determines that both the remote WTRU and the relay WTRU are connected to the same PGW (i.e., PGW-1 in FIG. 11) and would therefore modify the existing bearer between the relay WTRU and PGW.

Figure 17:
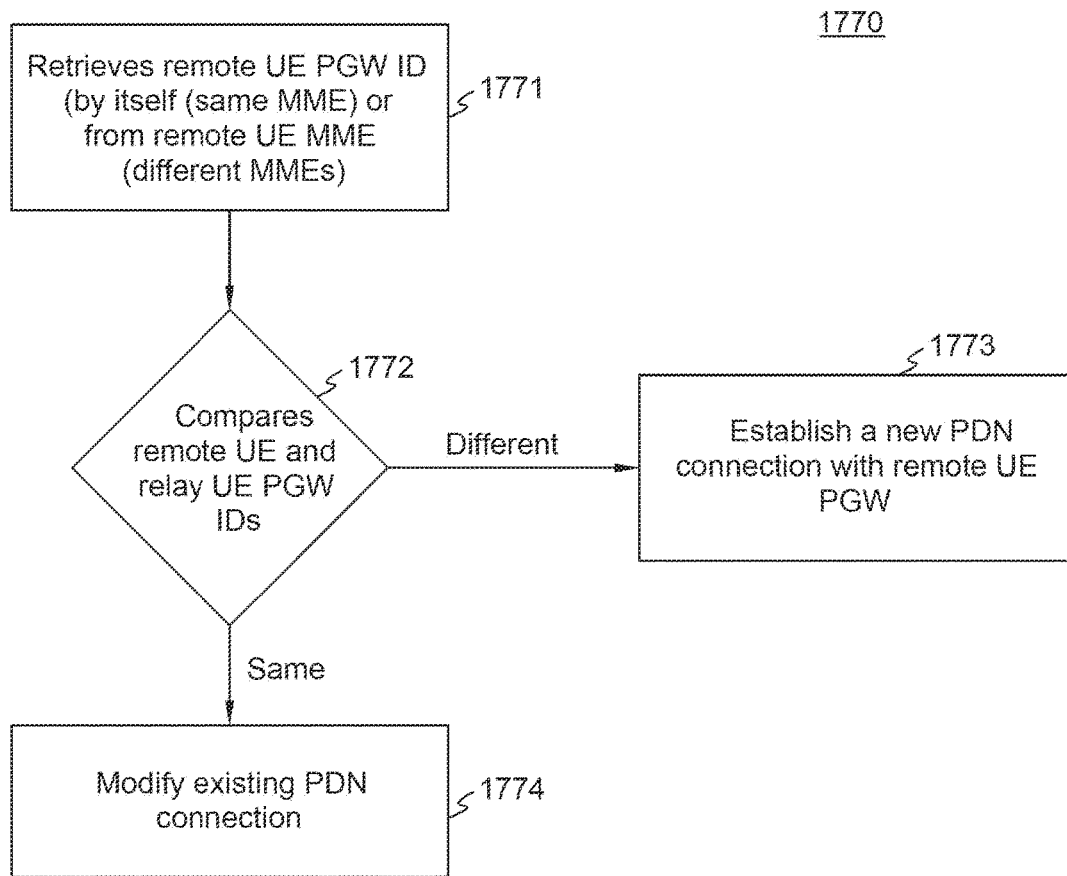
FIG. 17 is a diagram of an embodiment for decision flow at the MME.

Referring now to FIG. 17 a diagram 1770 of an embodiment for decision flow at the MME is shown. In an embodiment, when the relay WTRU receives the remote WTRU GUTI in step 1668, it may compare its own GUTI with the remote WTRU's GUTI at 1771 to determine that both WTRU's belong to the same MME, at 1772. In such a case, the relay WTRU may not include the remote WTRU's GUTI in the message (e.g., relay connection request 1669), and modify the WTRU's existing PDN connection. In some cases, only the IP address of the relay WTRU may be included in this message. The MME 1662b, upon receiving a relay connection request message 1669 with only the IP address of remote WTRUs 1661a, may determine that the remote WTRU 1661a belongs to the same MME 1662a, 1662b and may retrieve the remote WTRU's profile based on the received remote WTRU's IP address.

Based on the determination at 1772, the MME may modify an existing PDN connection to include the remote WTRU, in the case that the remote and relay WTRUs are determined to be associated with the same MME, at 1774. Alternatively, in the case that the WTRUs are determined to be associated with different MMEs, the MME may establish a new PDN connection with the remote WTRU, at 1773.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, performed by a remote wireless transmit/receive unit (WTRU), of selecting a relay node (RN), the method comprising:

receiving a broadcast discovery message from one or more RNs, the broadcast discovery message comprising a service code associated with a service type supported by the one or more RNs;

selecting a RN from the one or more RNs based upon a measured link quality of the received broadcast discovery message and the received service code;

establishing a connection between the remote WTRU and a base station through the selected RN;

monitoring a quality of the established connection between the remote WTRU and the selected RN; and upon the quality of the established connection falling below a threshold value, initiating a reselection of the one or more RNs.

2. The method of claim 1, wherein the broadcast discovery message comprises parameters to define a control channel for control plane signaling.

3. The method of claim 1, wherein the broadcast discovery message comprises an aggregate maximum bit rate (AMBR) parameter.

4. The method of claim 1, wherein the service code is associated with an access point name supported by the RN.

5. The method of claim 1, further comprising:
receiving periodic keep-alive messages after the connection is established that indicate a presence of the RN to the remote WTRU.

6. The method of claim 5, further comprising:
monitoring the periodic keep-alive messages with the selected RN; and
upon a number of keep-alive messages falling below a threshold value in a given time duration, initiating a reselection of the one or more RNs.

7. A wireless transmit receive unit (WTRU) configured to select a relay node (RN), the WTRU comprising:
a receiver configured to receive a broadcast discovery message from one or more RNs, the message comprising a service code associated with a service type supported by the RNs; and
a processor configured to select a RN from the one or more RNs based upon a measured link quality of the received broadcast discovery message and the received service code, and to establish a connection between the WTRU and a base station through the selected RN, the processor further configured to monitor a quality of the established connection between the WTRU and the selected RN, and to, upon the quality of the established connection falling below a threshold value, initiate a reselection of the one or more RNs.

8. The WTRU of claim 7, wherein the broadcast discovery message comprises parameters to define a control channel for control plane signaling.

9. The WTRU of claim 7, wherein the broadcast discovery message comprises an aggregate maximum bit rate (AMBR) parameter.

10. The WTRU of claim 7, wherein the service code is associated with an access point name supported by the RN.

11. The WTRU of claim 7, wherein the receiver is further configured to receive periodic keep-alive messages after the connection is established that indicate a presence of the RN to the WTRU.

12. The WTRU of claim 11, wherein the processor is further configured to monitor the periodic keep-alive messages with the selected RN, and to upon a number of keep-alive messages falling below a threshold value in a given time duration, initiate a reselection of the one or more RNs.

* * * * *